United States Patent
Perez-Sanchez

(10) Patent No.: US 7,063,292 B2
(45) Date of Patent: Jun. 20, 2006

(54) ACTUATION APPARATUS FOR A CONTROL FLAP ARRANGED ON A TRAILING EDGE OF AN AIRCRAFT AIRFOIL

(75) Inventor: Juan Perez-Sanchez, Feldkirchen-Westerham (DE)

(73) Assignee: EADS Deutschland GmbH, Ottobrunn (DE)

(*) Notice: Subject to any disclaimer, the term of this patent is extended or adjusted under 35 U.S.C. 154(b) by 0 days.

(21) Appl. No.: 10/947,436

(22) Filed: Sep. 23, 2004

(65) Prior Publication Data

US 2005/0116115 A1    Jun. 2, 2005

Related U.S. Application Data

(63) Continuation of application No. 10/875,325, filed on Jun. 25, 2004, now abandoned.

(30) Foreign Application Priority Data

Jun. 25, 2003 (DE) ............................. 103 28 717

(51) Int. Cl.
*B64C 9/06* (2006.01)
(52) U.S. Cl. .................. 244/216; 244/75.1; 244/99.3
(58) Field of Classification Search .............. 244/75 R, 244/216, 99.2, 99.3
See application file for complete search history.

(56) References Cited

U.S. PATENT DOCUMENTS

| | | | |
|---|---|---|---|
| 2,218,114 A | 10/1940 | Kunze | |
| 2,404,956 A | 7/1946 | Gouge | |
| 2,973,925 A | 3/1961 | Wiele et al. | |
| 4,405,105 A | 9/1983 | Dilmaghani et al. | |
| 4,434,959 A | 3/1984 | Rudolph | |
| 4,702,442 A | 10/1987 | Weiland et al. | |
| 5,651,513 A * | 7/1997 | Arena | 244/75 R |
| 6,010,097 A * | 1/2000 | Cox | 244/216 |

FOREIGN PATENT DOCUMENTS

| | | |
|---|---|---|
| DE | 2114670 | 10/1972 |
| DE | 2611918 | 11/1976 |
| DE | 19647077 | 5/1998 |
| EP | 0909705 | 4/1999 |
| GB | 1547905 | 6/1979 |

* cited by examiner

Primary Examiner—Peter M. Poon
Assistant Examiner—T D. Collins
(74) Attorney, Agent, or Firm—Crowell & Moring LLP

(57) ABSTRACT

An actuation apparatus for a control flap which is disposed on the trailing edge of the wing of an aircraft and which can be displaced between a stowed position and an extended position, in which it is displaced rearwardly relative to the trailing edge of the wing and angled downwardly relative to the wing plane; and corresponding intermediate positions. The actuation apparatus has a pyramid mechanism arrangement connected, on the one hand, to the load-bearing structure of the wing and, on the other hand, to the control flap, with at least one virtual axis which lies, in particular, at a finite distance from the plane of the wing profile and relative to which the control flap can be displaced.

17 Claims, 20 Drawing Sheets

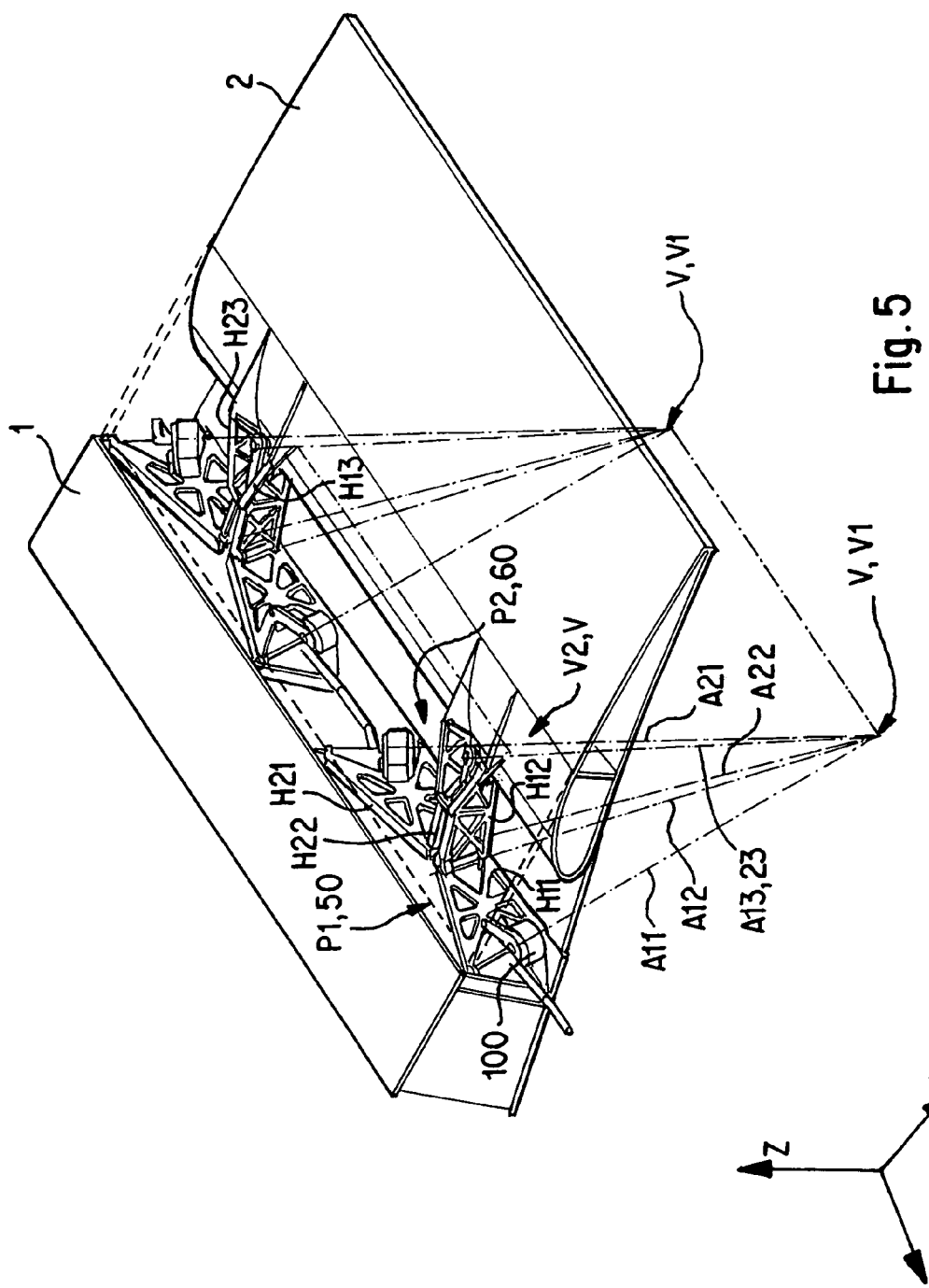

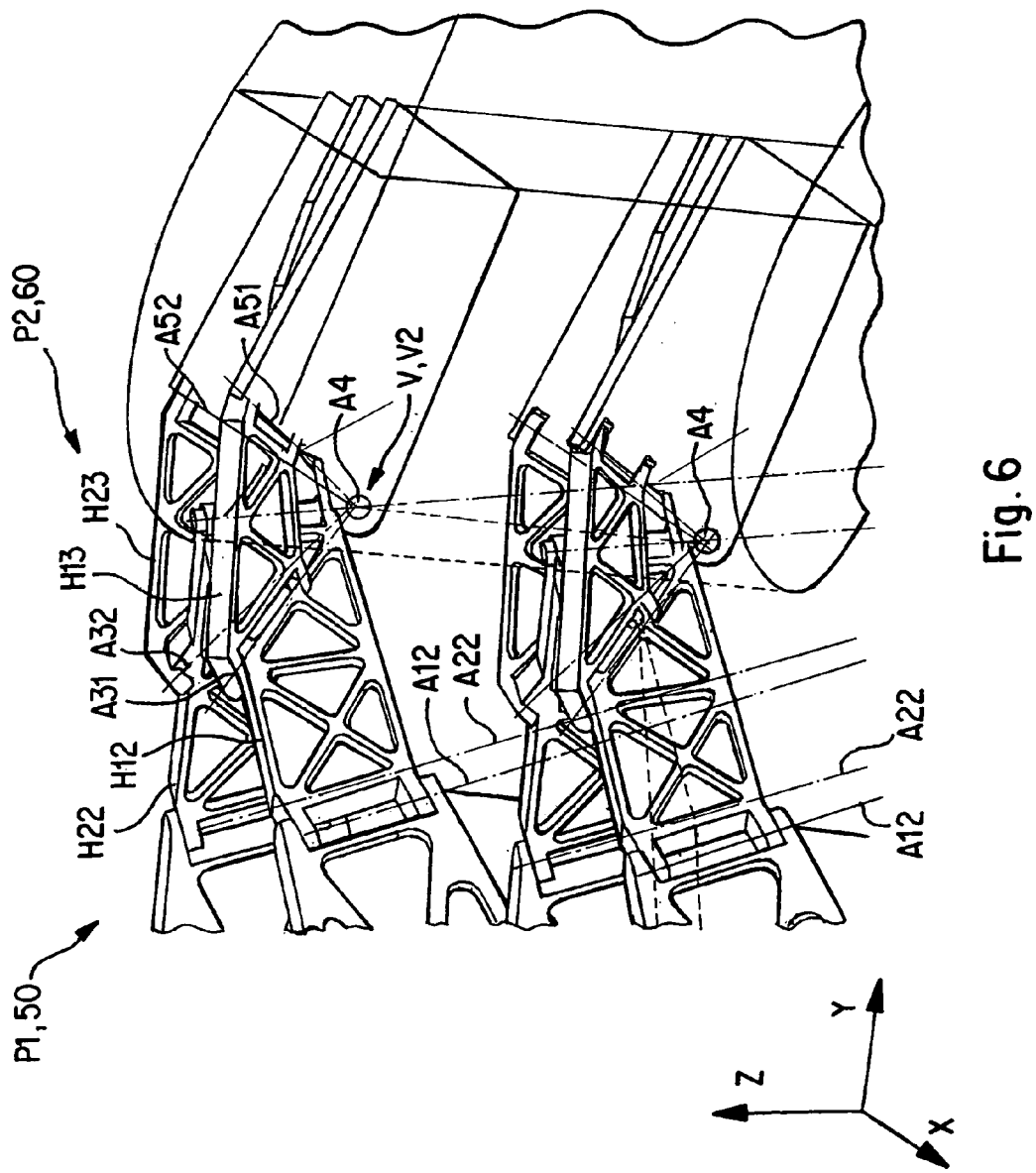

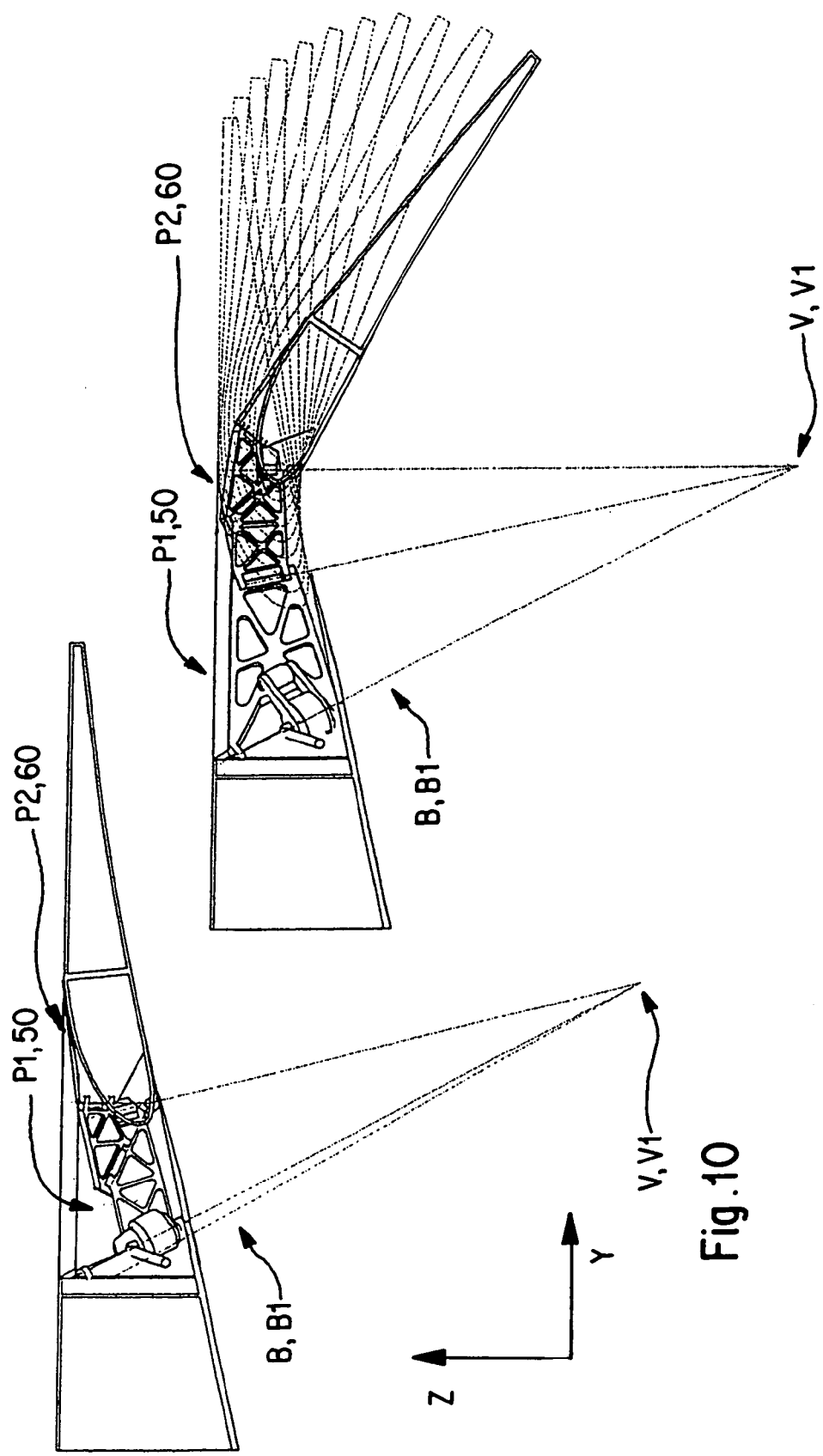

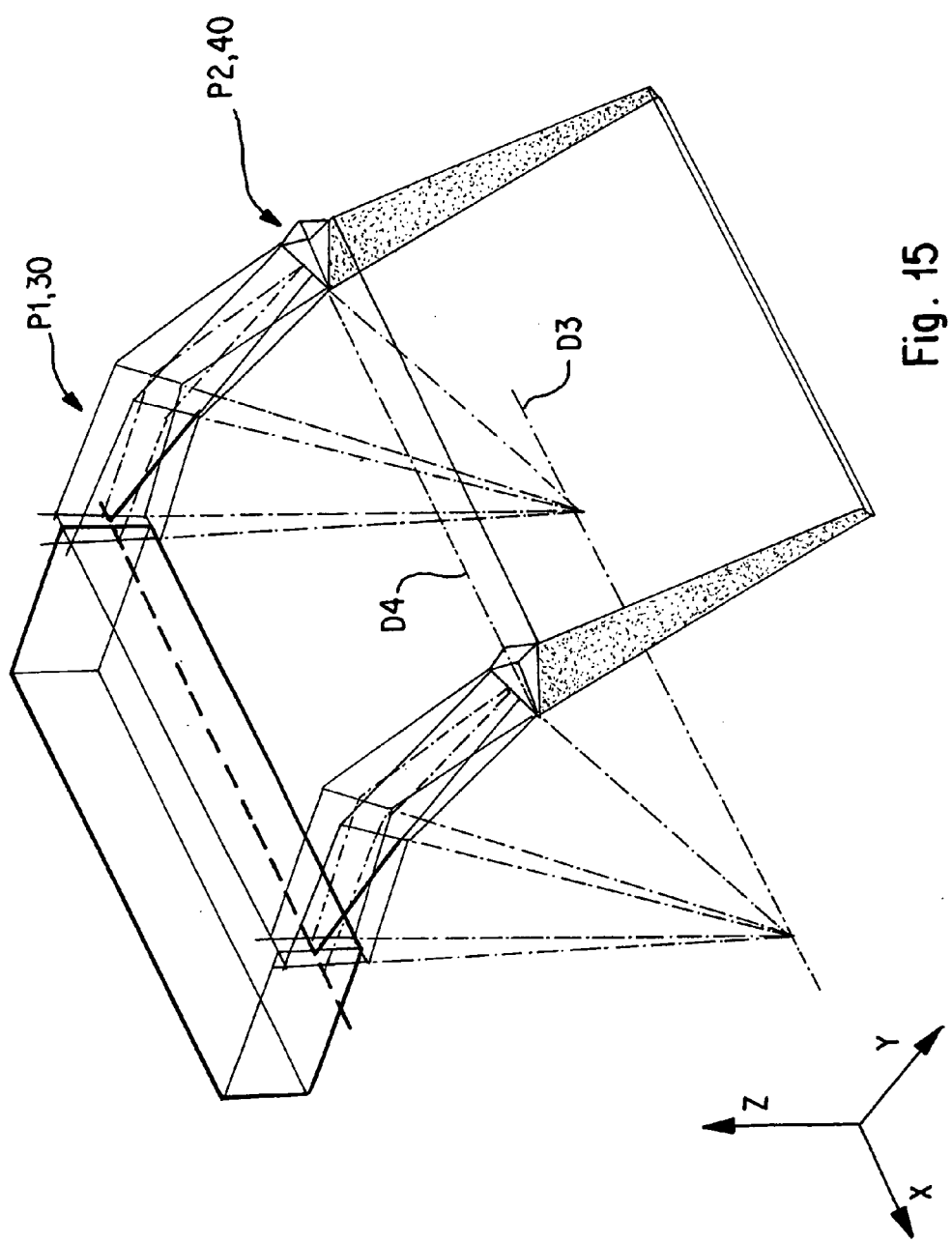

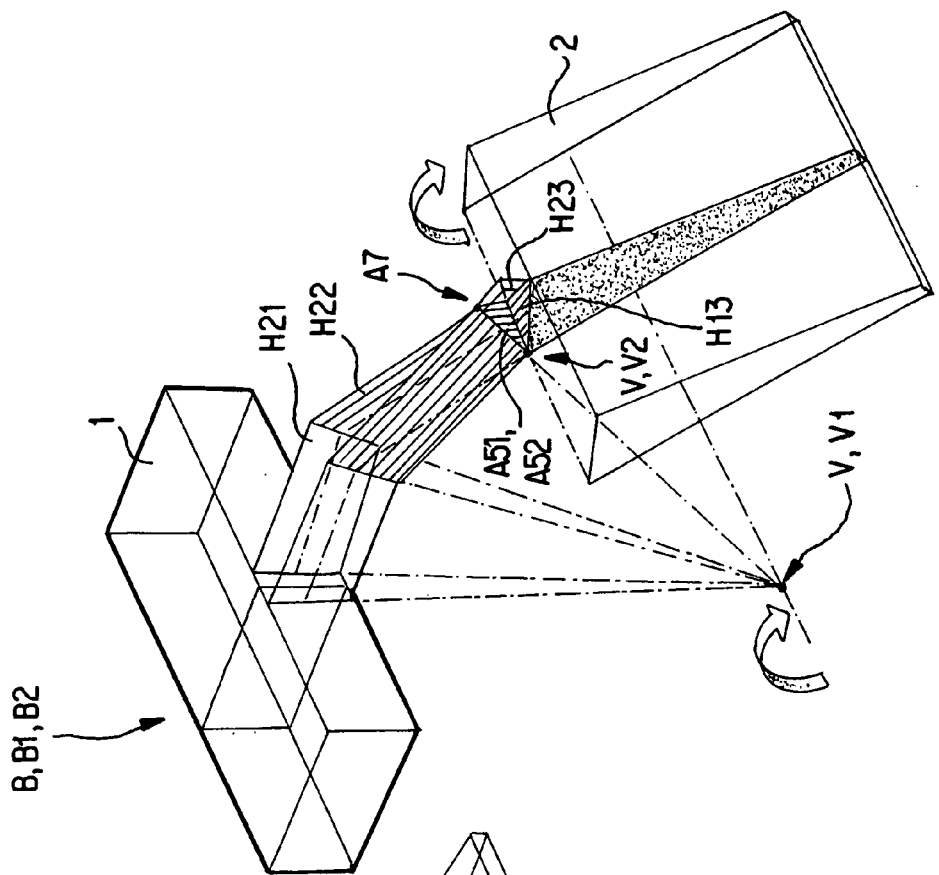
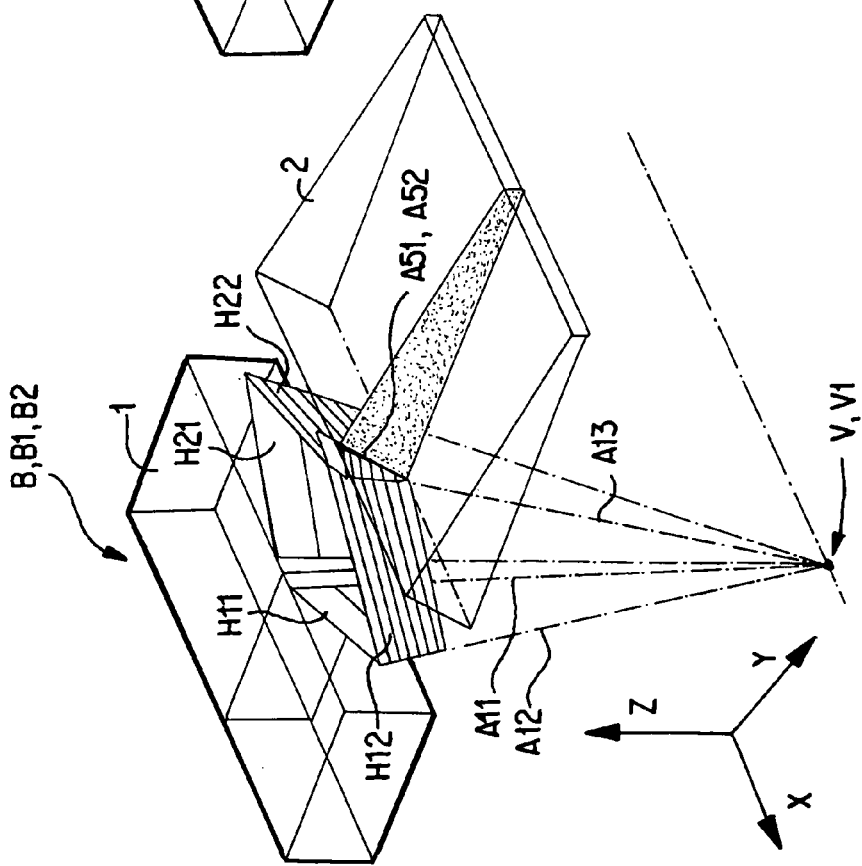

ACTUATION APPARATUS FOR A CONTROL
FLAP ARRANGED ON A TRAILING EDGE
OF AN AIRCRAFT AIRFOIL

This application claims the priority of German application No. 10328717.5, filed Jun. 25, 2003, the disclosure of which is expressly incorporated by reference herein. This application is a continuation of abandoned U.S. application Ser. No. 10/875,325, filed Jun. 25, 2004.

BACKGROUND AND SUMMARY OF THE INVENTION

The invention relates to an actuation apparatus for a control flap arranged on the trailing edge of an airfoil of an aircraft. Preferred embodiments of the invention relate to an actuation apparatus for moving the control flap relative to the wing between a stowed position and an extended position with a rotational and a translational component.

To increase lift for takeoff and landing and certain other flight maneuvers, control flaps are used, among other means, which are disposed on the trailing edge of the aircraft wing and, in the manner of a so-called Fowler flap, are displaced in a combined translational and rotational motion between a stowed position, in which they are located near the trailing edge of the wing and substantially in the wing plane, and an extended position, in which they are displaced rearwardly relative to the trailing edge of the wing and angled downwardly relative to the wing plane, and the corresponding intermediate positions.

To control such control flaps, mechanisms are required which must be able, on the one hand, to absorb the very high loads occurring on the flaps and, on the other hand, to execute highly precise movements.

A number of different types of such actuation apparatuses are known in the art.

German Laid Open Publication DE 26 11 918 A1, U.S. Pat. No. 4,702,442 and U.S. Pat. No. 4,434,959 each describe actuation apparatuses for control flaps disposed on the trailing edge of the wing of an aircraft and serving to increase lift. In these apparatuses, two control flaps, here in the form of so-called double-slotted Fowler flaps, are connected in series in the direction of the profile depth of the wing. In the extended position they are spaced apart from each other and from the trailing edge of the wing, respectively, to form a gap allowing the air stream coming from the underside of the wing to pass through. The flaps are held and can be controlled by a mechanism disposed on the load-bearing structure of the wing, which has a plurality of joints and intercoupled scissor-type flat stays and can be driven by a crank drive.

German Laid Open Publication DE 196 47 077 A1 describes an actuation apparatus for a control flap used to increase lift, in which the flap, in the area of its leading end, is flexibly connected with a support carrier, which via guide elements is guided in, and can be displaced along a track provided near the trailing edge of the wing and extending in the direction of the profile depth of the wing. At a force application point located further rearward in the direction of the profile depth, the flap is pivotably coupled by means of a rocker with the trailing end of a support extending in the direction of the profile depth, which also carries the track for the support carrier. When actuated by means of a crank drive, the control flap, on the one hand, is displaced rearwardly on the support carrier and, on the other hand, is angled downwardly, via the rocker.

The prior-art actuation apparatuses have in common that the mechanisms are accommodated in pod-like housings, so-called fairings, which are accommodated below the wing. As the flaps are extended these pods are adjusted downwardly, partly following the combined translational and rotational motion. The pods require a large amount of space and increase the aerodynamic cross-section and thereby the resistance and fuel consumption of the aircraft during cruising, and they reduce the aerodynamic efficiency of the control flap by blocking the airflow between the trailing edge of the wing and the extended flap. They are also a source of irritating noise.

An object of the invention is to provide an improved actuation apparatus.

According to the invention, this object is attained by an actuation apparatus for a control flap disposed on the trailing edge of the wing of an aircraft, wherein the actuation apparatus comprises at least one adjustment unit which is connected, on the one hand, to the load-bearing structure of a wing and, on the other hand, to a control flap, with at least one virtual axis of rotation lying at a finite distance from a plane of the wing. The actuation apparatus includes driving means, with respect to which the structural parts can be displaced in relation to each other.

Advantageous features of preferred embodiments of the actuation apparatus according to the invention are described herein and in the claims.

According to a preferred embodiment of the invention, an actuation apparatus is provided for moving two structural parts relative to each other between a stowed position and an extended position with a rotational motion and a translational motion component. This actuation apparatus has at least one adjustment device with at least one virtual axis of rotation, which is located, in particular, at a finite distance from the plane of the wing profile. The adjustment device is connected with the load-bearing structure of the wing on the one hand and the control flap on the other. The actuation apparatus further has driving means to displace the structural parts relative to each other.

The invention provides an actuation apparatus for a control flap disposed on the trailing edge of the wing of an aircraft. The control flap can be displaced between a stowed position in which it is stowed near the trailing edge of the wing and substantially lies in the wing plane, and an extended position in which it is displaced rearwardly relative to the trailing edge of the wing and angled downwardly relative to the wing plane, and the corresponding intermediate positions. As provided by the invention, the actuation apparatus has a pyramid mechanism arrangement, which is connected with the load-bearing structure of the wing on the one hand and the control flap on the other, with at least one virtual axis of rotation located, in particular, at a finite distance from the plane of the wing profile in relation to which the control flap can be displaced, and driving means for retracting and extending the control flap.

One advantage of the actuation apparatus according to the invention is that it does not require any pods (fairings) to be provided on the underside of the wing, such that aerodynamic resistance, fuel consumption and noise development are reduced. A further advantage is that it has a smaller number of moving parts, which means lower production costs and greater reliability and ease of maintenance.

One embodiment of the actuation apparatus according to the invention provides that the actuation apparatus includes a pyramid mechanism arrangement, which essentially serves to change the distance of the control flap from the trailing edge of the wing, and an adjustment device, which is mechanically coupled to the pyramid mechanism arrangement and essentially serves to adjust the angle of the control flap.

In a preferred embodiment thereof, the adjustment device is formed by a second pyramid mechanism, which is mechanically connected in series with a first pyramid mechanism of the pyramid mechanism arrangement between the load-bearing structure of the wing and the control flap.

In a preferred embodiment of the actuation apparatus according to the invention, the pyramid mechanism arrangement includes a first and a second pyramid mechanism, which are mechanically connected in series between the load-bearing structure of the wing and the control flap.

Preferably, the first and second pyramid mechanisms have virtual axes of rotation that are located at different distances.

A preferred embodiment provides that the first pyramid mechanism, which is arranged closer to the wing, has a more remote virtual axis of rotation than the second pyramid mechanism, which is disposed closer to the control flap.

The more remote virtual axis of rotation can be at infinity.

In the actuation apparatus according to the invention it is preferably provided that the first and/or second pyramid mechanism each have a first leg and a second leg, which at their one end are flexibly interconnected by a common pivot axis and at their other end are directly or indirectly connected with the wing via first end axes and directly or indirectly connected to the control flap via a second end axis.

In particular, it is provided that the first and the second end axis and the pivot axis intersect at a common vertex, which lies on the virtual axis of rotation.

One embodiment of the actuation apparatus according to the invention provides that the first leg of the first pyramid mechanism with its first end axis is connected to the load-bearing structure of the wing at a point which is laterally offset in the direction parallel to the virtual axis of rotation relative to the point at which the second leg with its second end axis is directly or indirectly connected to the control flap by a distance which substantially corresponds to the length of the first leg.

Another preferred embodiment of the actuation apparatus according to the invention provides that the first leg of the first pyramid mechanisms with its first end axis is connected to the load-bearing structure of the wing at a point which, as seen in direction of the profile depth, is substantially aligned in front of the point at which the second leg with its second end axis is directly or indirectly connected to the control flap.

Preferred embodiments of the actuation apparatus according to the invention may provide that the second pyramid mechanism is mechanically connected in series behind the first pyramid mechanism, such that the first leg of the second pyramid mechanism with its first end axis is connected to or shares the second end axis of the first pyramid mechanism, and such that the second leg of the second pyramid mechanism with its second end axis is connected to the control flap at a point which, as seen in the direction of the profile depth, is substantially aligned behind the point at which the first leg with its first end axis is connected to the first pyramid mechanism.

Yet another embodiment of the actuation apparatus according to the invention provides that the actuation apparatus has a single pyramid mechanism arrangement, which serves both to change the distance of the control flap from the trailing edge of the wing and to adjust the angle of the control flap.

Advantageously, the driving means for retracting and extending the control flap is a rotary actuator mechanism coupled to the first pyramid mechanism.

In a preferred embodiment, the rotary actuator mechanism is coupled to and driven by a drive shaft, which substantially extends in the direction of the length of the wing.

A preferred embodiment provides that the second pyramid mechanism is coupled to and driven by the first pyramid mechanism.

In particular, it may be provided that the first leg of the second pyramid mechanism is coupled to or integral with and driven by the second leg of the first pyramid mechanism.

Other objects, advantages and novel features of the present invention will become apparent from the following detailed description of the invention when considered in conjunction with the accompanying drawings.

BRIEF DESCRIPTION OF THE DRAWINGS

FIG. 5 is a detailed perspective view of another embodiment of the actuation apparatus in the arrangement on the control flap shown in FIG. 3 with two parallel-acting adjustment devices, FIG. 6 is another perspective view of the embodiment of the actuation apparatus shown in FIG. 5, FIG. 10 is a side view of the embodiment of the actuation apparatus according to FIG. 5 in a position where the control flap is stowed, FIG. 11 is a side view of the embodiment of the actuation apparatus according to FIG. 5 in a position in which the control flap is extended, which also outlines the intermediate positions of the control flap, FIG. 15 shows the actuation apparatus according to FIG. 14 in an extended position, FIG. 16 is a schematic view of another embodiment based on the embodiment depicted in FIG. 14 with an arrangement of two actuation apparatuses, such that the first adjustment device is formed by two parallel-acting pairs of levers and the second adjustment device by two parallel-acting levers and a rotary joint in the axis of rotation of the corresponding end axis of the first adjustment device, showing the actuation apparatus in its stowed position.

FIG. 17 is a schematic view of the embodiment according to FIG. 16 in the extended position, with the rotary axis pyramids of the adjustment devices extending in a different orientation.

DETAILED DESCRIPTION

Figure 1:
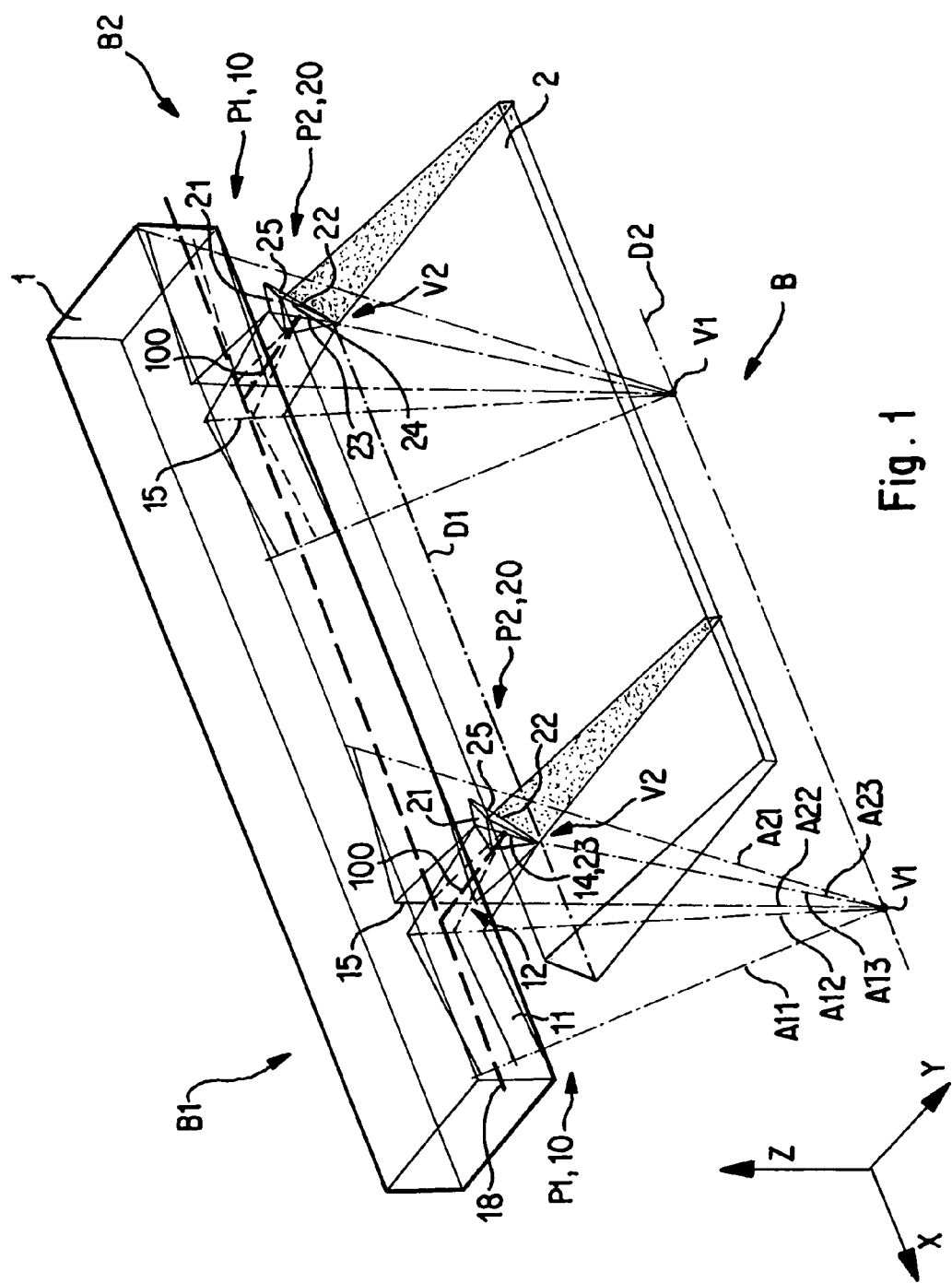
FIG. 1 is a schematic perspective view of an embodiment of two parallel-acting actuation apparatuses according to an embodiment of the invention in a stowed position, which is arranged on a wing for the adjustment of a control flap and has a first and a second adjustment device, each with three axes of rotation and configured with two parallel-extending pairs of levers which form the edges of a three-sided pyramid, such that the rotary axis pyramids of the adjustment devices have the same orientation.

The figures schematically show a wing box of an aircraft wing 1 at the trailing edge of which a control flap 2 is arranged. This control flap serves to increase lift in conventional manner and can be displaced by means of the actuation apparatus B according to the invention in the manner of a Fowler flap in a combined translational and rotational motion between a stowed position and an extended position as well as intermediate positions. In the stowed position the control flap 2 is typically located near or at the wing 1 (e.g., FIGS. 1 and 14). In the extended position the control flap is displaced rearwardly in relation to the trailing edge of the wing 1 or in flow direction or essentially in the wing depth direction X and angled downwardly about an axis in approximately the wingspan direction, i.e., against the direction of the lifting force (e.g., FIGS. 2 and 15). The invention, however, can also be used generally to control wings or structural parts or wing parts and can be disposed on the wing or on the structural part to be controlled. Below, the invention is described with respect to its preferred use on a control flap, which can also be a lift flap. The invention could also be directed to the actuation of a slat or a canard.

The actuation apparatus B connects the wing 1 and the control flap 2 and serves to extend and retract the control flap 2 by means of a control device and an actuator mechanism controlled thereby (not depicted). It is also possible to arrange two, or more than two actuator apparatuses to displace a control flap between a support element, i.e., for example, a wing, and the control flap 2 or the structural part, such that two or more actuation apparatuses are acting in parallel. It is also possible to connect, i.e., intercouple two, or more than two actuation apparatuses in series with respect to their line of action.

According to the invention, the actuation apparatus B includes a first and a second adjustment unit P1 and P2, which are coupled in series in their line or chain of action or in the displacement direction. Each adjustment unit P1 and P2 has a total of at least three adjustment axes A11, A12, A13 and A21, A22, A23 of which two adjustment axes A11, A13 and A21, A23 are end axes relative to the adjustment motion. The adjustment axes are axes of rotation or pivot axes of adjustment levers of the adjustment unit. Each adjustment unit P1 or P2 is configured in such a way that when it is actuated, the end axes execute a translational and rotational motion relative to each other. To this end, each adjustment unit P1 and P2 is configured such that the three adjustment axes A11, A12, A13 and A21, A22, A23, at least in an intermediate position of the actuation apparatus B, B1, B2, form the edges of a three-sided pyramid with a vertex V. The adjustment device can therefore also be referred to as a pyramid drive, since it is a joint with an arrangement of joint axes in pyramid form or an arrangement of joint axes forming the edges of a three-sided pyramid.

The vertex V is preferably spaced at a distance from a central line of action (referred to as line of action for short) of the translational motion of the pyramid mechanism, such that, when the adjustment device is displaced, a translational component is produced as the control flap 2 or the structural part is displaced. With increasing distance of the vertex V from the line of action of the translational motion, the rotational motion component that can be executed by the corresponding pyramid mechanism decreases while the translational motion component increases.

The vertices V, in their relation to each other, can be located on the same side (FIG. 1, 2, 3 to 11, 14, 15, 23 and 24) or on different sides (FIG. 12, 13, 16 to 23) relative to the corresponding line of action for the translational motion.

The adjustment device provided according to the invention can be implemented in different ways. According to the invention, at least one of the at least two adjustment devices of an actuation apparatus B1, B2 is formed by at least one lever pair with three hinge axes, which are the two end axes, A11, A13 and A21, A23, and a central axis, A12 and A22. In the depicted embodiments of the actuation apparatuses B1, B2, the respective first adjustment units P1 are formed in this manner, i.e., the adjustment units arranged on the wing 1 or on a support element. Both or all the adjustment devices, or only one of the adjustment devices can be realized in this manner. The second or additional adjustment device can be configured in the same way (FIGS. 1, 2 and 14, 15) or in a different way (FIGS. 3 to 11, 12 and 13, 16 to 22, 23 and 24).

In the adjustment devices shown in the figures, two parallel action strands are provided for each actuation apparatus B1, B2, which in the depicted first adjustment devices include one pair of levers with three adjustment axes. Depending on the application, however, it is also possible to provide only a single action strand with one pair of levers.

To move or displace each actuation apparatus, an actuator is preferably coupled thereto. An actuator, however, can also drive a plurality of actuation apparatuses, e.g., via a drive shaft or another force or torque transmission element or gear, provided there is a corresponding interdependence of their relative motion.

When two adjustment units P1, P2 (FIGS. 1, 2 and 14, 15) that can be controlled independently are connected in series, the end axis A11, A13 and A21, A23 which couples the two adjustment units assumes the function of an adjustment axis for both adjustment units P1, P2 connected in series. In other words, an adjustment axis is an end axis for the two coupled adjustment devices.

The second adjustment unit P2 can also be mechanically coupled to the first adjustment unit P1 and vice versa, such that the one adjustment unit is displaced when the other adjustment unit is moved. This mechanical connection is hereinafter referred to as a forced coupling. As a result only one actuator needs to be coupled to one of the two adjustment units to actuate or displace the entire actuation apparatus B or B1, B2. Such a coupling is illustrated in the embodiments of FIGS. 3 to 11, 12 and 13, 16 to 22, 23 and 24. The arrangement or sequence of the adjustment units can also be realized in the reverse direction of that shown in the figures. It is also possible to provide more than two adjustment units. In these non-illustrated embodiments, the inventive features described below must be supplemented correspondingly.

In the depicted mechanically force-coupled adjustment units, the first adjustment unit P1 disposed on the wing consists of two parallel-acting pairs of levers, i.e., three adjustment axes A11, A12, A13, while the second adjustment unit P2 disposed on the control flap includes two parallel-acting levers with two adjustment axes A31, A32 and a not necessarily required rotary joint A4 in the adjustment axis A13 of the corresponding end axis of the first adjustment device. With the rotary joint A4, the second adjustment unit is linked to the structure that actuates the second pyramid mechanism, i.e., in the embodiments shown, the control flap. The rotary axis A4 of this second rotary joint then extends in the direction of the axis of rotation of the displacement motion of the control flap.

When two series-connected adjustment units P1, P2 are forcibly coupled, the corresponding adjustment axis A31 (or A32 in the parallel strand of action) of the second adjustment unit, in the view of the respective figures, in the preferred embodiment, is disposed directly or indirectly (e.g., via a transmission element) on the lever of the first adjustment unit P1 or 50, 70. The respective adjustment axis A31 (or A32) is disposed at an angle to the plane of action of the corresponding lever of the first adjustment unit P1. Preferably, this adjustment axis A31 (or A32) extends within, i.e., in the plane of action of the lever, such that it is not identical with the end axis A3 of the first pyramid mechanism (see, for example, FIG. 3 to 6). This pivot axis A31 (or A32) forms an adjustment axis of the second adjustment unit P2 or 60, 80. An additional adjustment axis of the second adjustment unit of this embodiment is the end axis A51, A52, which is disposed on the control flap and is the outer end axis of the adjustment device. For this purpose, the rotary joint A4 is provided for additional force transmission during the displacement of the actuation apparatus, so as to enable a corresponding rotation of the control flap. As a result, the axis of the rotary joint extends perpendicularly to the translational direction of the pyramid mechanism or perpendicularly to the wing depth direction, such that the vertex of the pyramid axes is located in the center of the axis of the rotary joint to avoid mechanical jamming of the second adjustment device.

Figure 2:
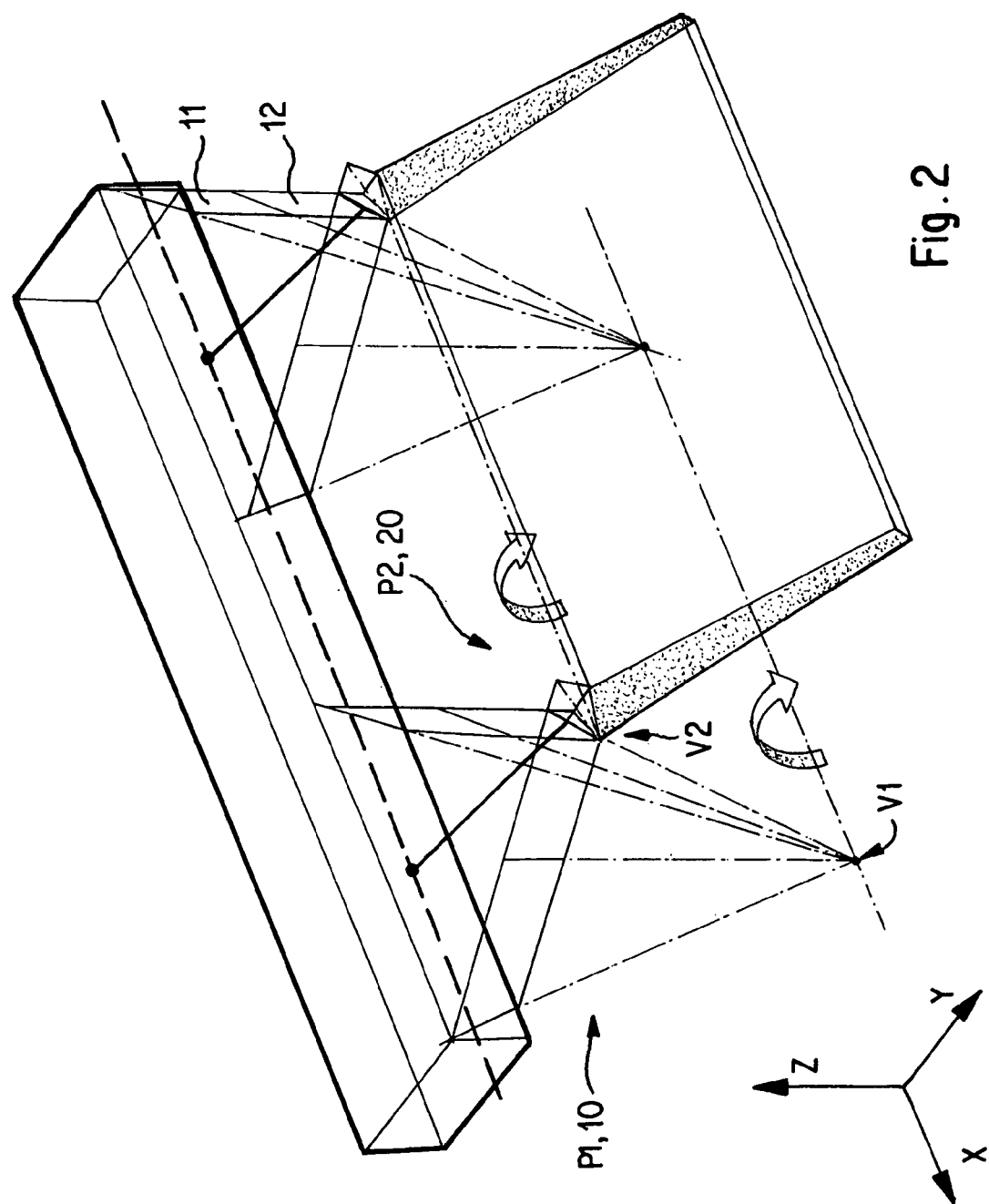
FIG. 2 shows the actuation apparatus according to FIG. 1 in an extended position.
Figure 4:
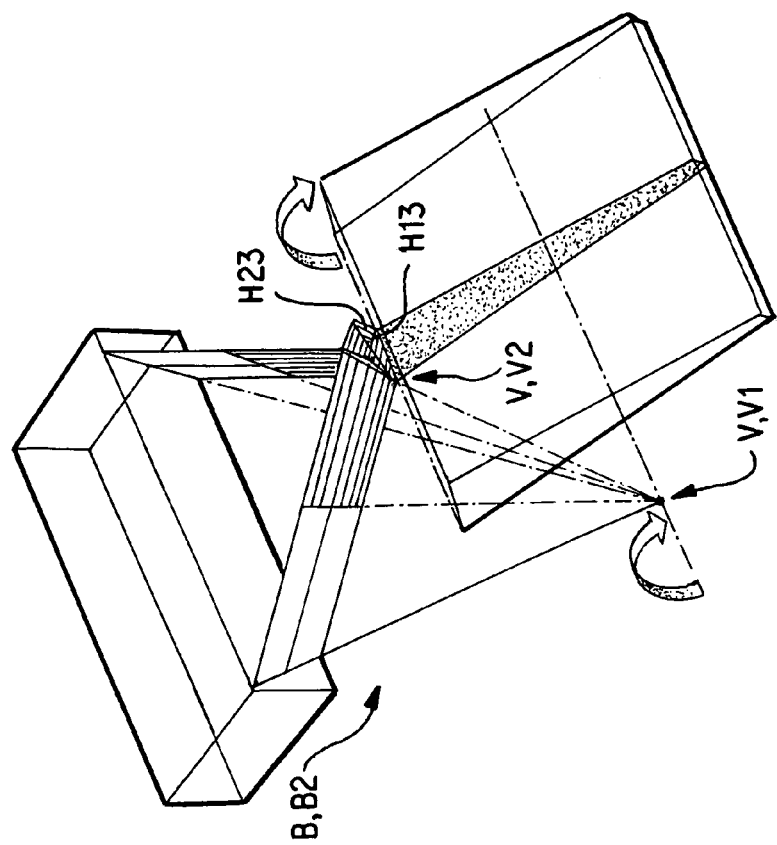
FIG. 4 shows the actuation apparatus according to FIG. 3 in the extended position.
Figure 3:
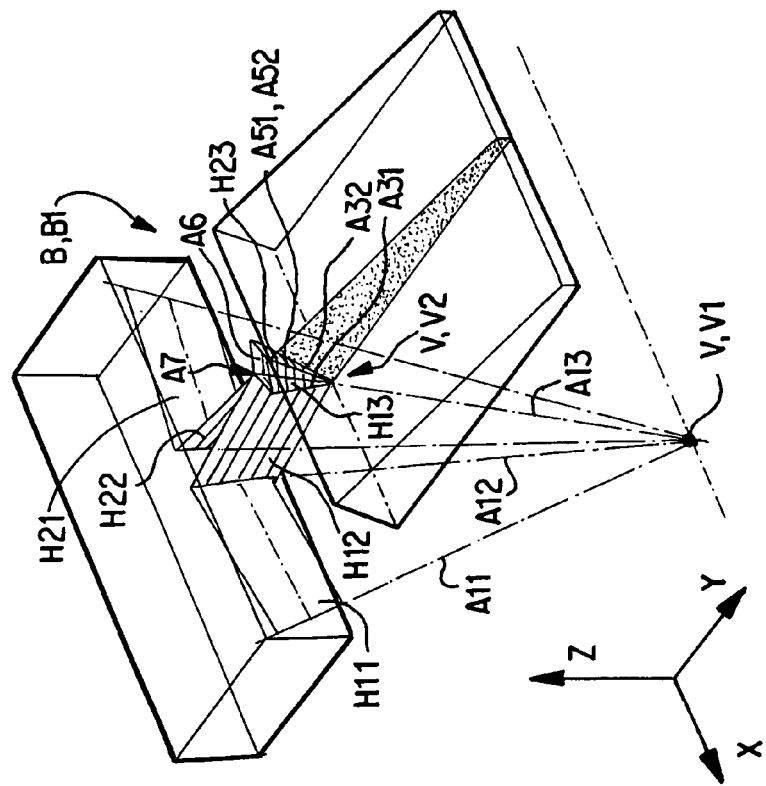
FIG. 3 is a schematic view of another embodiment of the arrangement of two actuation apparatuses for the adjustment of a control flap on a wing in a stowed position, such that the first adjustment device is formed by two parallel-acting pairs of levers and the second adjustment device by two parallel-acting levers and a rotary joint in the axis of rotation of the corresponding end axis of the first adjustment device, with the actuation apparatus being shown in the extended position.
Figure 7:
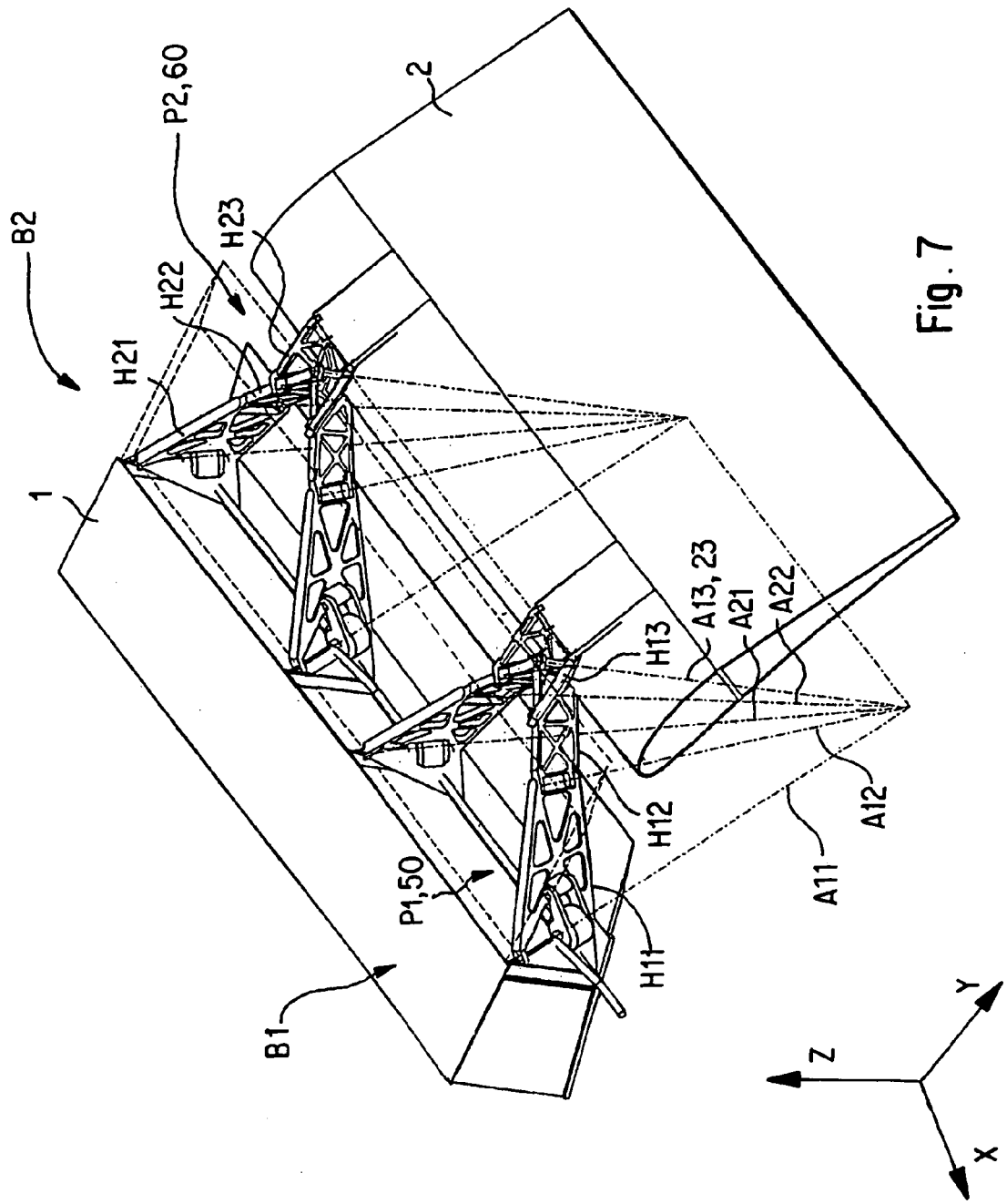
FIG. 7 is another perspective view of the embodiment of the actuation apparatus according to FIG. 5 in a position in which the control flap is extended.
Figure 8:
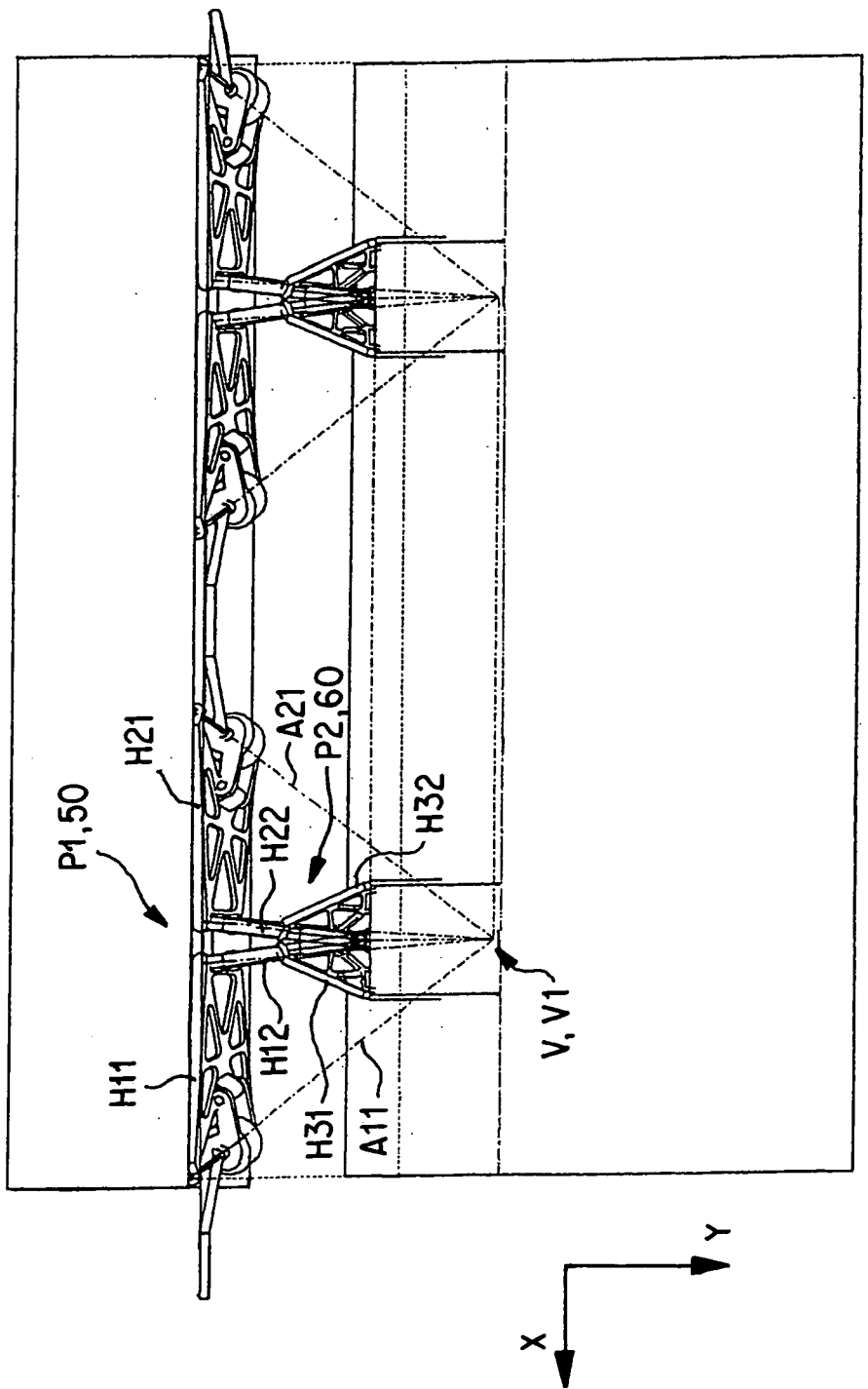
FIG. 8 is another perspective view from an angle above the control flap of the embodiment of the actuation apparatus according FIG. 5 in a position where the control flap is stowed.
Figure 9:
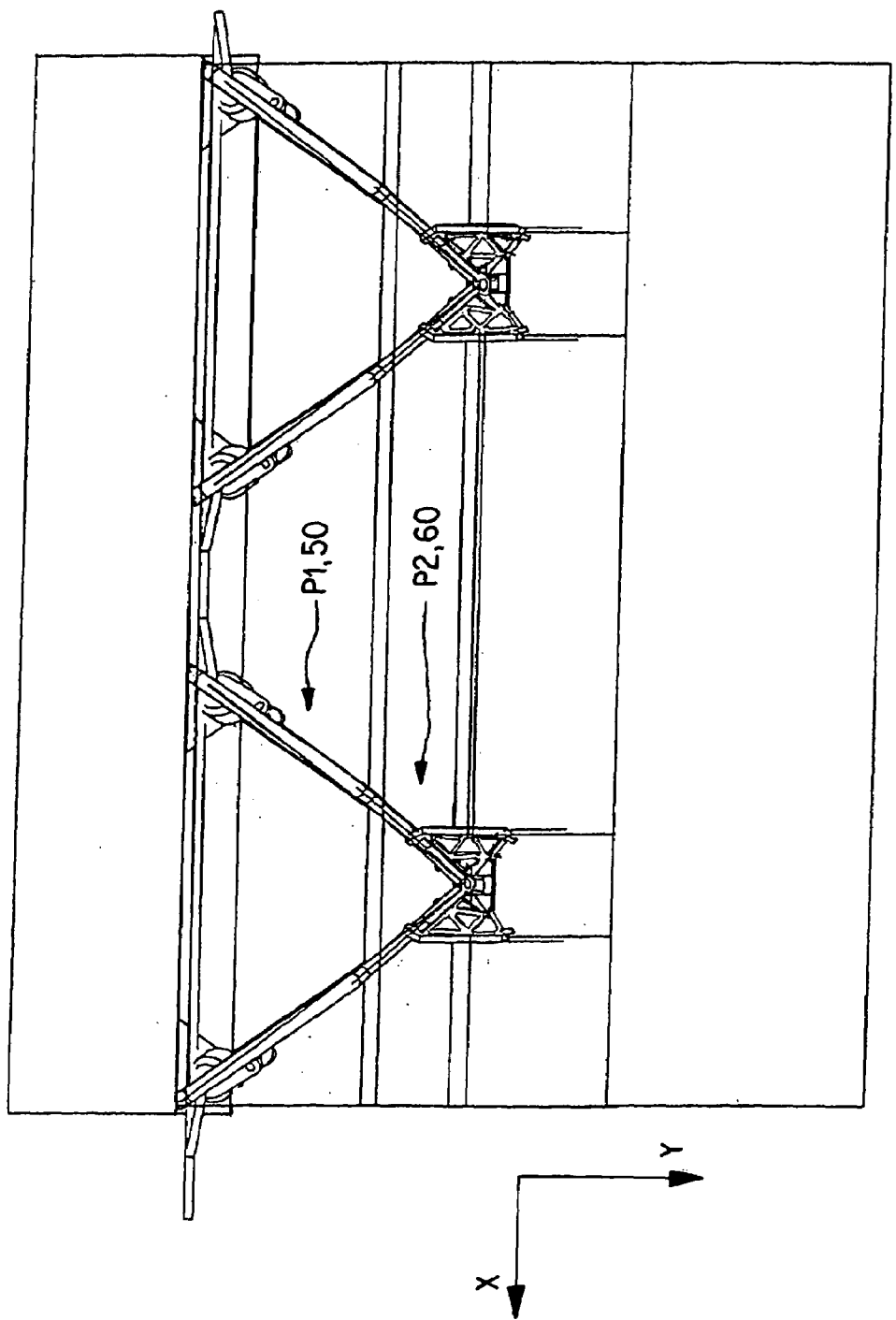
FIG. 9 is another perspective top view of the embodiment of the actuation apparatus according to FIG. 5 in a position where the control flap is extended.
Figure 13:
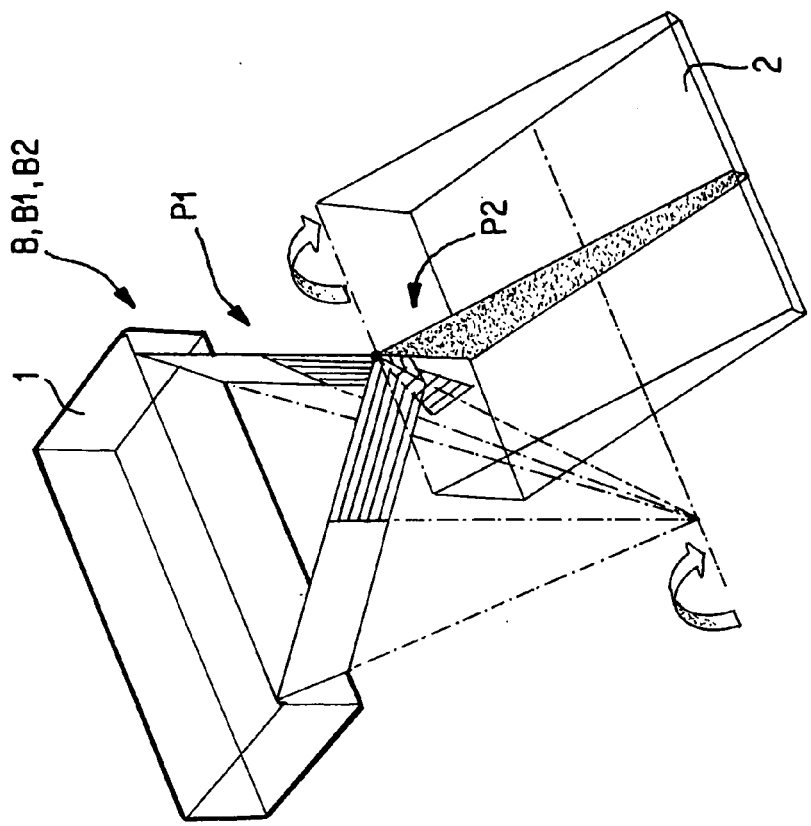
FIG. 13 shows the embodiment according to FIG. 12 in the same view as FIG. 12 but with extended control flap.
Figure 12:
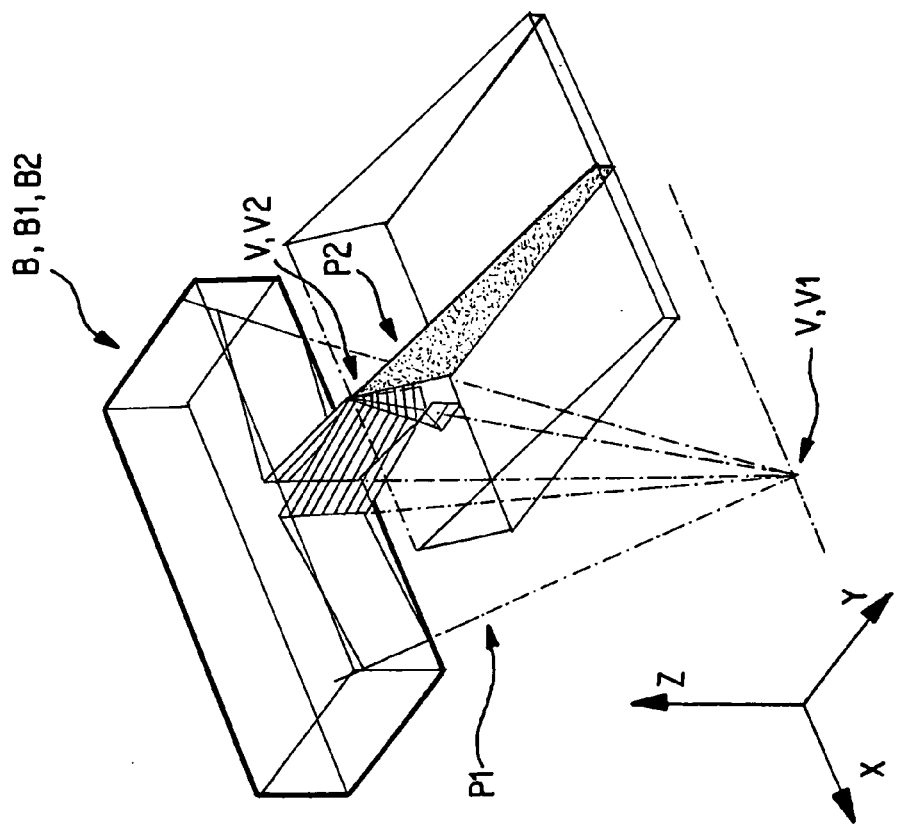
FIG. 12 is a schematic view of another embodiment of the invention as an alternative to the embodiment depicted in FIG. 3 and 4, in which the rotary axis pyramids of the adjustment devices extend in the same orientation and which shows the stowed position of the control flap.

The following describes embodiments of the invention in which two adjustment units series-connected in a chain of action can be controlled or actuated independently. They are illustrated in FIGS. 1 and 2 as well as 14 and 15. The embodiment shown in FIGS. 1 and 2 has a first adjustment unit P1 in which the adjustment levers acting in pairs are folded toward each other when they are in their stowed position. The embodiment shown in FIGS. 14 and 15 has a first adjustment unit P1 in which the adjustment levers acting in pairs are folded in opposite direction when they are in their stowed position.

The first and second adjustment units or pyramid mechanisms 10, 20 or 30, 40 according to FIGS. 1, 2 and 14, 15 each contain a first adjustment lever or leg 11, 21 and 31, 41 and a second adjustment lever or leg 12, 22 and 32, 42, which at their one end are flexibly interconnected by a common adjustment axis or inner axis 15, 25, and 35, 45, namely in terms of a hinged joint, and which at their other ends have first outer or end or adjustment axes 13, 23 and 33, 43 and second outer or end or adjustment axes 14, 24 and 34, 44. The first and second end or adjustment axes 13, 23, 33, 43 and 14, 24; 34, 44 and the inner adjustment axis 15, 25; 35, 45 intersect at a common vertex, which defines a virtual axis of rotation A11, A12; A13 or A21, 22, 23. When the angle of the first leg 11, 21; 31, 41 is changed relative to the second leg 12, 22; 32, 42 about the common pivot axis 15, 25; 35, 45, a rotation about the virtual axis of rotation occurs. In general, the virtual axis of rotation can be at any finite or infinite distance. In the latter case a rotation along a radius of infinite length occurs, i.e., a translation. The distance of the virtual axis of rotation is directly related to the angle which the first end axis 13, 23; 33, 43 and the second end axis 14, 24; 34, 44 assume in relation to each other and to the common pivot axis 15, 25; 35, 45.

In the two embodiments shown, the first and second pyramid mechanisms 10; 30 and 20; 40 have axes of rotation A1; A3 and A2; A4 that are located at different distances, such that the first pyramid mechanism 10; 30, which is arranged closer to the wing 1, has a more remote virtual axis of rotation A1; A3 than the second pyramid mechanism 20; 40 which is closer to the control flap 2 and the virtual axis of rotation of which is closer.

In this manner, an actuation of the first pyramid mechanism 10; 30 is more likely to produce a change in the distance of the control flap 2 from the trailing edge of the wing 1 than a rotation, whereas the actuation of the second pyramid mechanism 20; 40 is more likely to produce a rotation and thus an adjustment of the angle of the control flap 2 than a translation.

In the two embodiments shown, the first pyramid mechanisms 10; 30 thus primarily serve to displace the control flap 2 in relation to the trailing edge of the wing 1, such that a combined translational and rotational motion occurs if the virtual axis of rotation of the first pyramid mechanism 10; 30 lies at a finite distance as shown in FIG. 1, 2; 14, 15, and a pure translational motion takes place in the special case where the virtual axis of rotation is at an infinite distance. In contrast, the second pyramid mechanism 20; 40, which is coupled to the first pyramid mechanism 10; 30, can be understood as an adjustment device that essentially serves to adjust the angle of the control flap 2, since here a rotational motion takes place primarily whereas the translational motion is minor.

In the first embodiment shown in FIGS. 1 and 2, the first end axis 13 of the first leg 11 of the first pyramid mechanism 10 is connected to the load-bearing structure of the wing 1 at a point which is laterally offset as seen in the direction parallel to the virtual axis of rotation A1 by a distance which substantially corresponds to the length of the first leg 11 relative to the point at which the second end axis 14 of the second leg 12 is connected indirectly to the control flap 2 via the second pyramid mechanism 30. When the control flap 2 is extended, the first and second legs 11, 12 are thus moved from their angled position shown in FIG. 1 to their extended position shown in FIG. 2.

Figure 14:
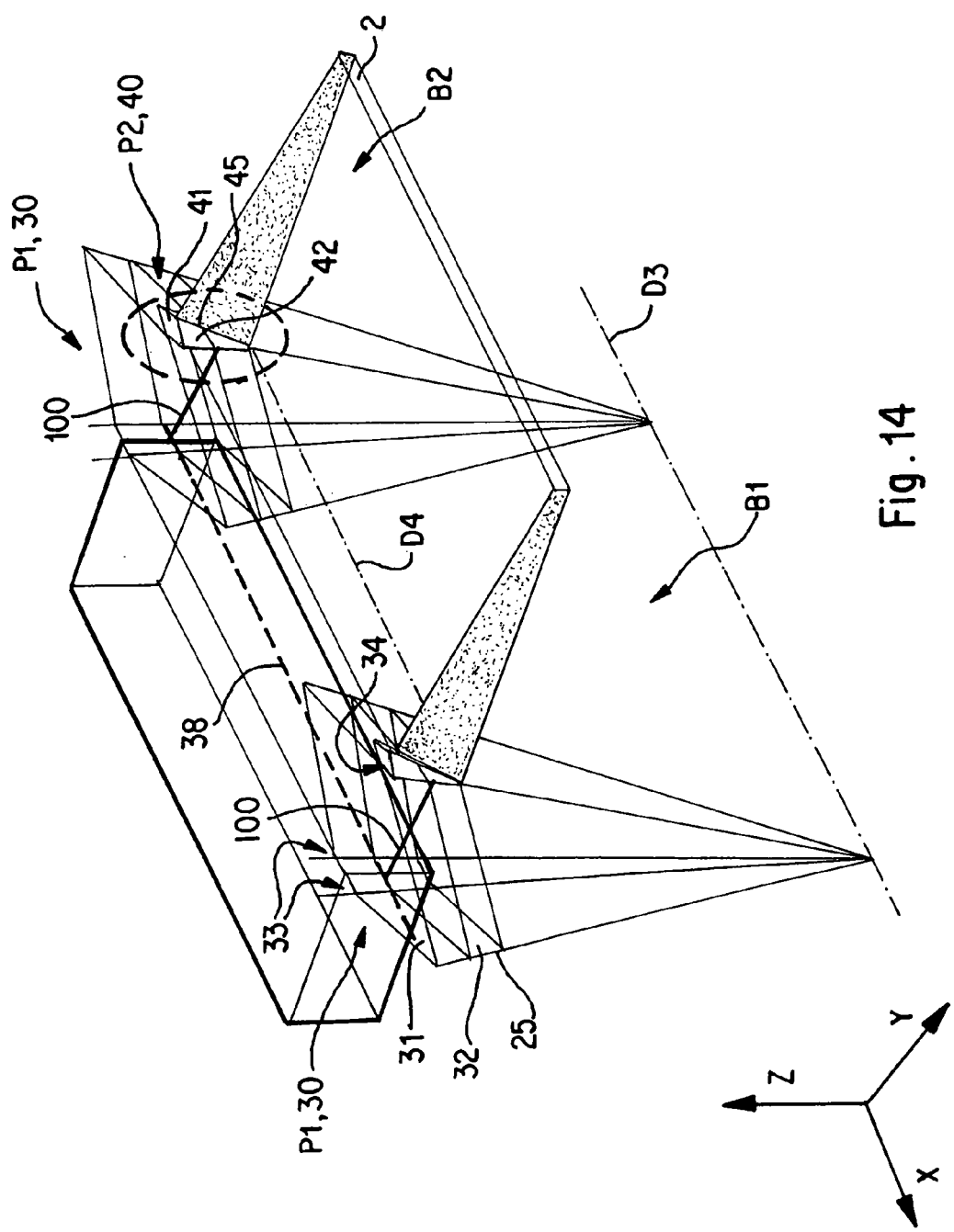
FIG. 14 is a schematic perspective view of an embodiment that is an alternative to that shown in FIG. 1 with two parallel-acting actuation apparatuses according to the invention in a stowed position, such that the rotary axis pyramids of the adjustment devices extend in the same orientation.
Figure 18:
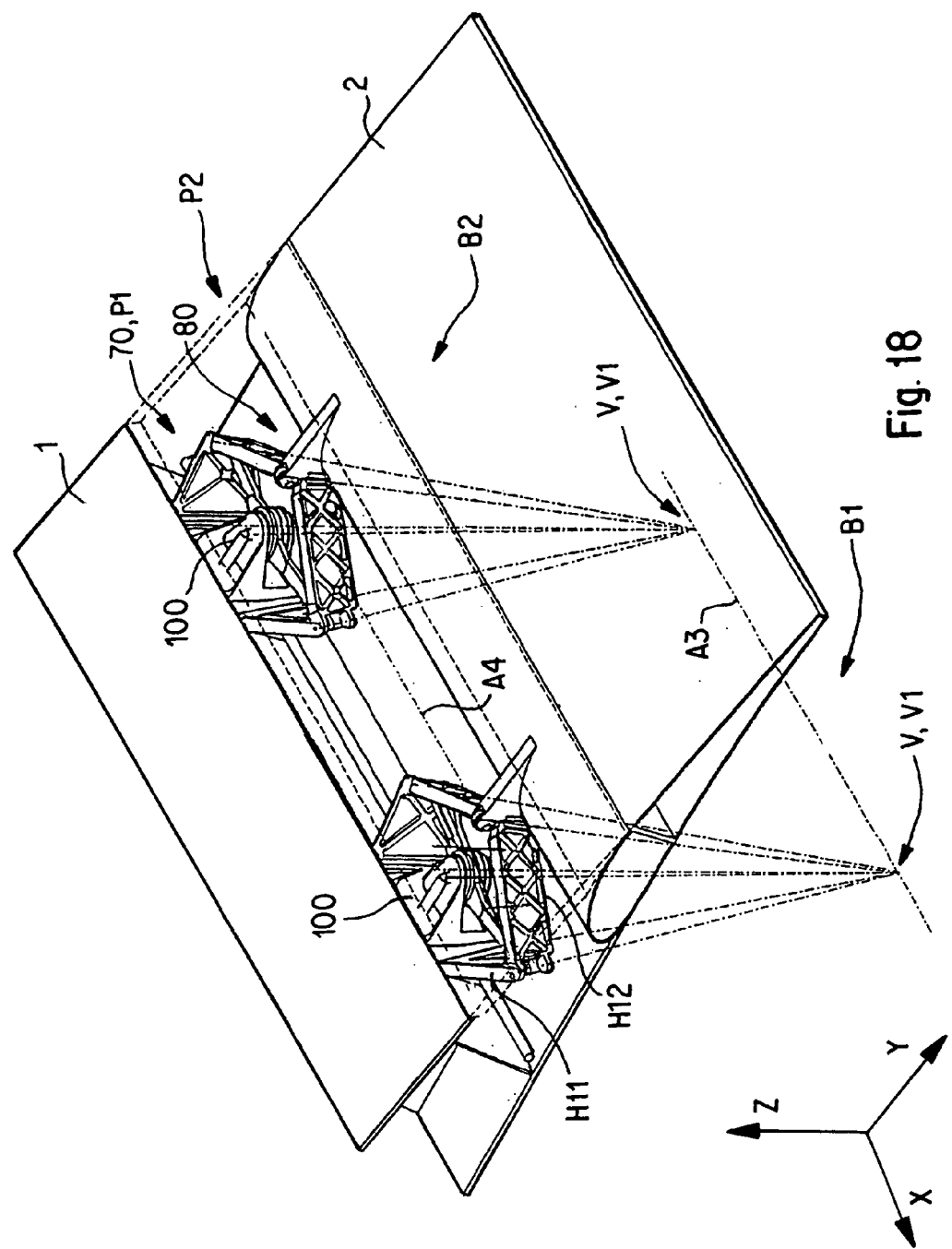
FIG. 18 is a detailed perspective view of another embodiment of the actuation apparatus in the arrangement on the control flap according to FIG. 16 with two parallel-acting adjustment devices.
Figure 19:
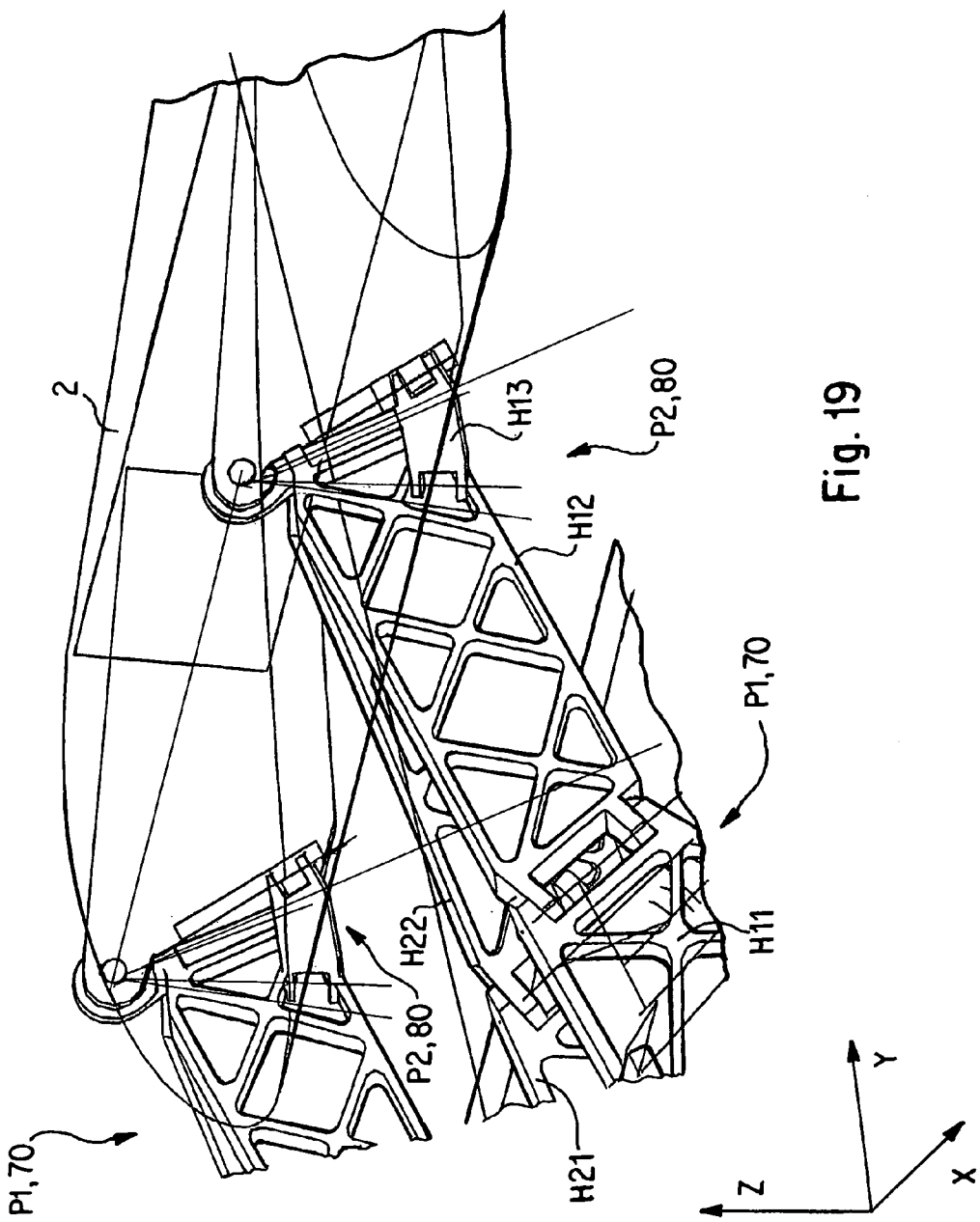
FIG. 19 is another perspective view of the embodiment of the actuation apparatus according to FIG. 18.
Figure 20:
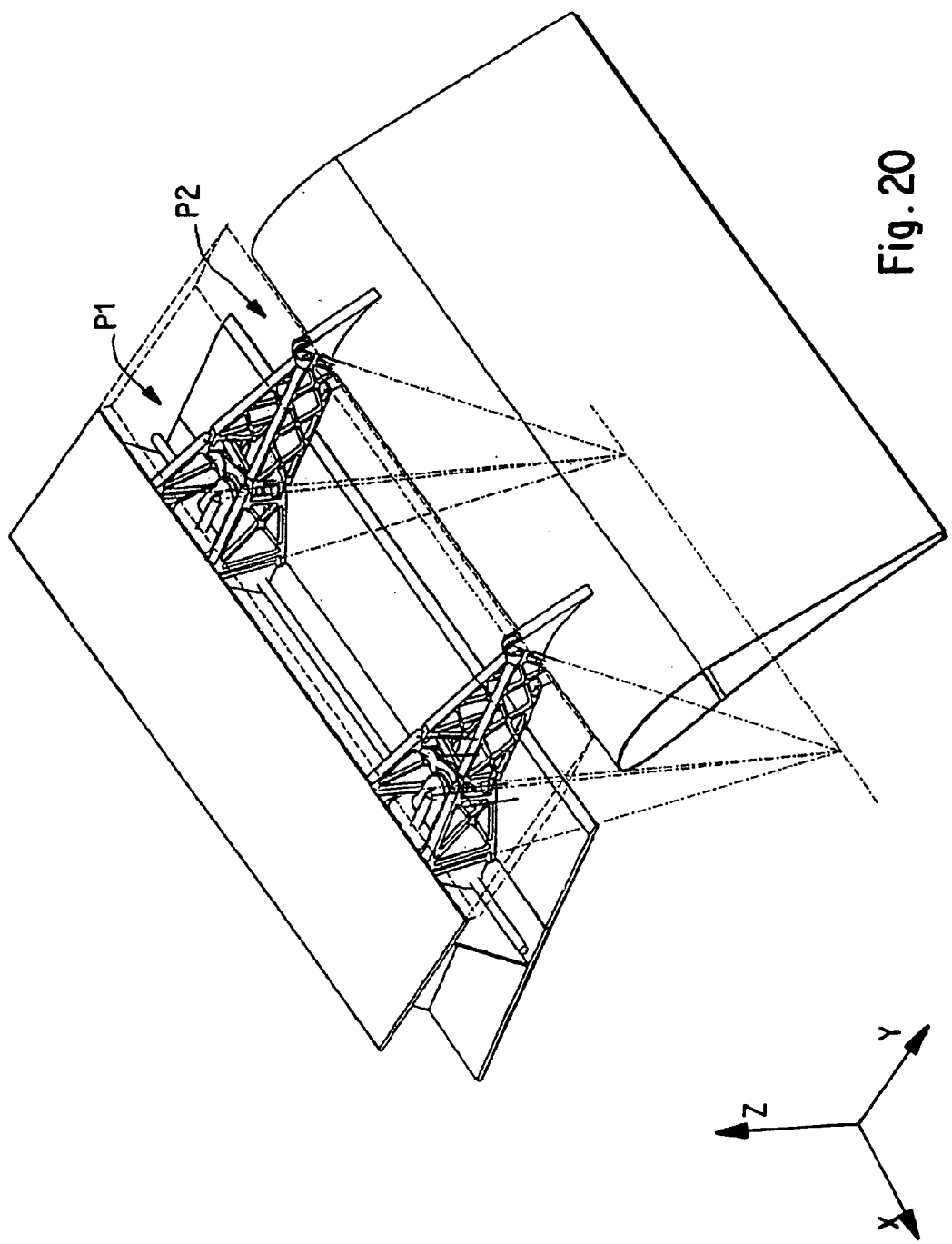
FIG. 20 is another perspective view of the embodiment of the actuation apparatus according to FIG. 18 in the extended position.
Figure 21:
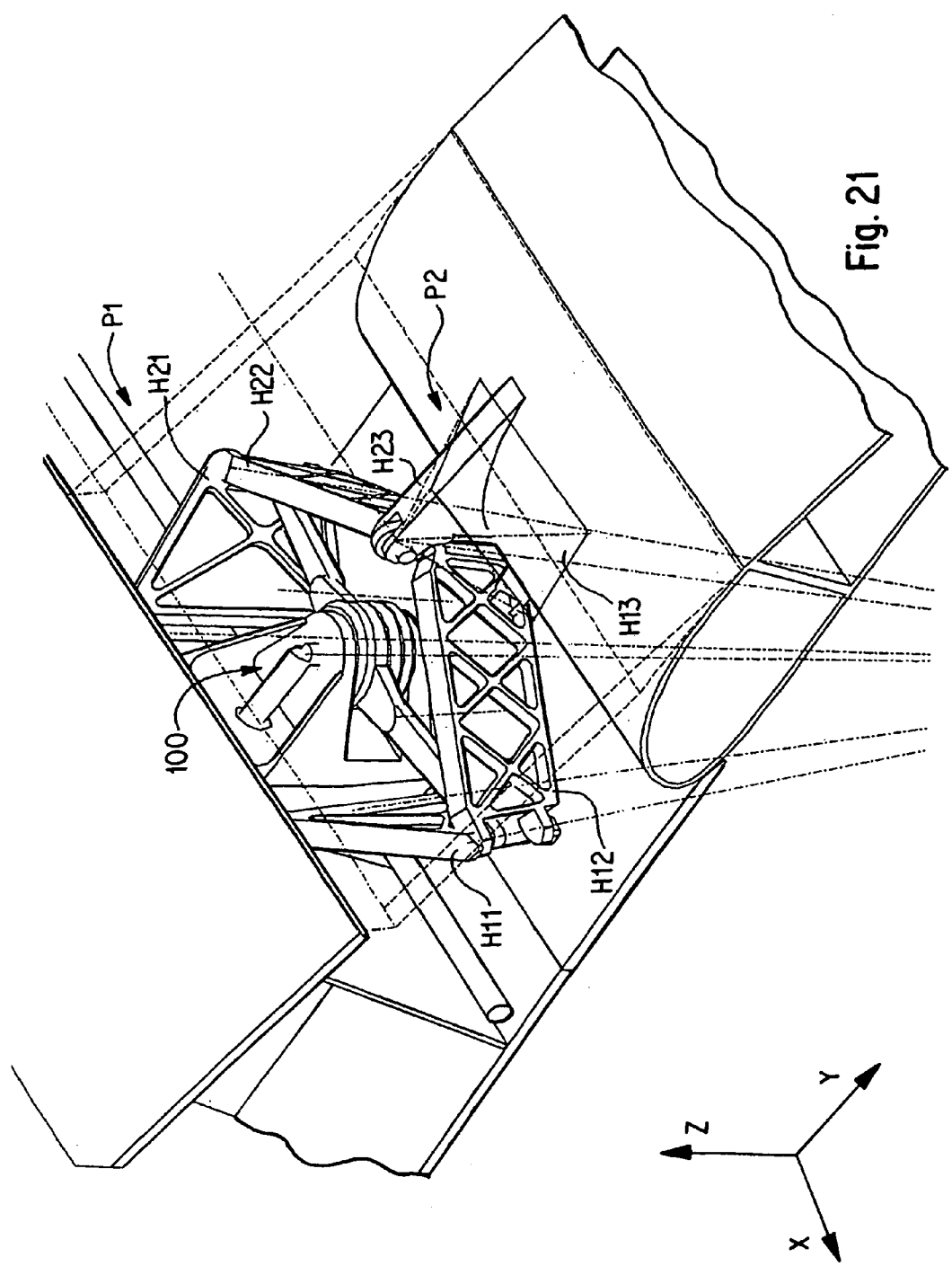
FIG. 21 is another perspective view of a part of the embodiment of the actuation apparatus according to FIG. 18 in the stowed position.
Figure 22:
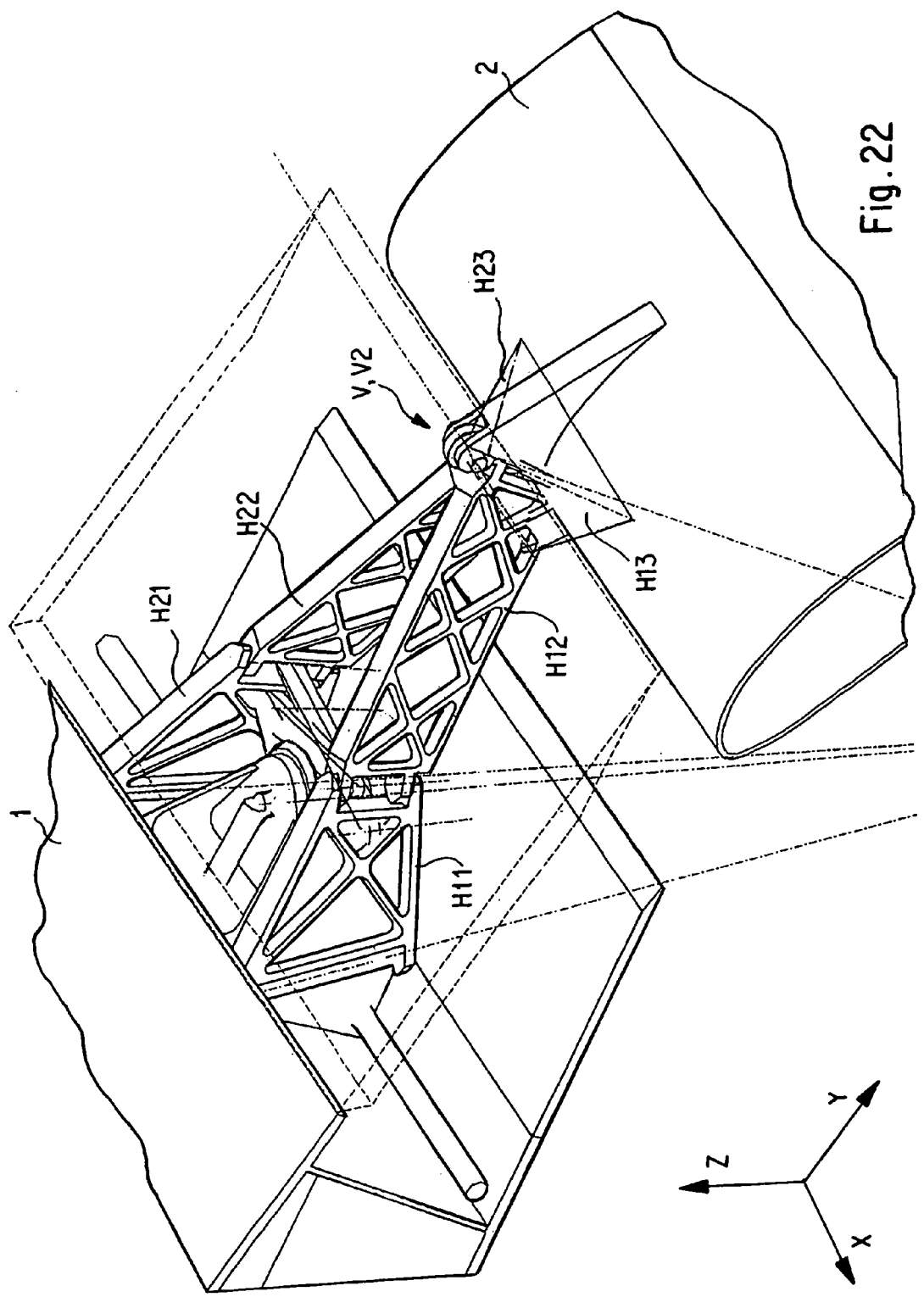
FIG. 22 is another perspective view of a part of the embodiment of the actuation apparatus according to FIG. 18 in the extended position.
Figure 24:
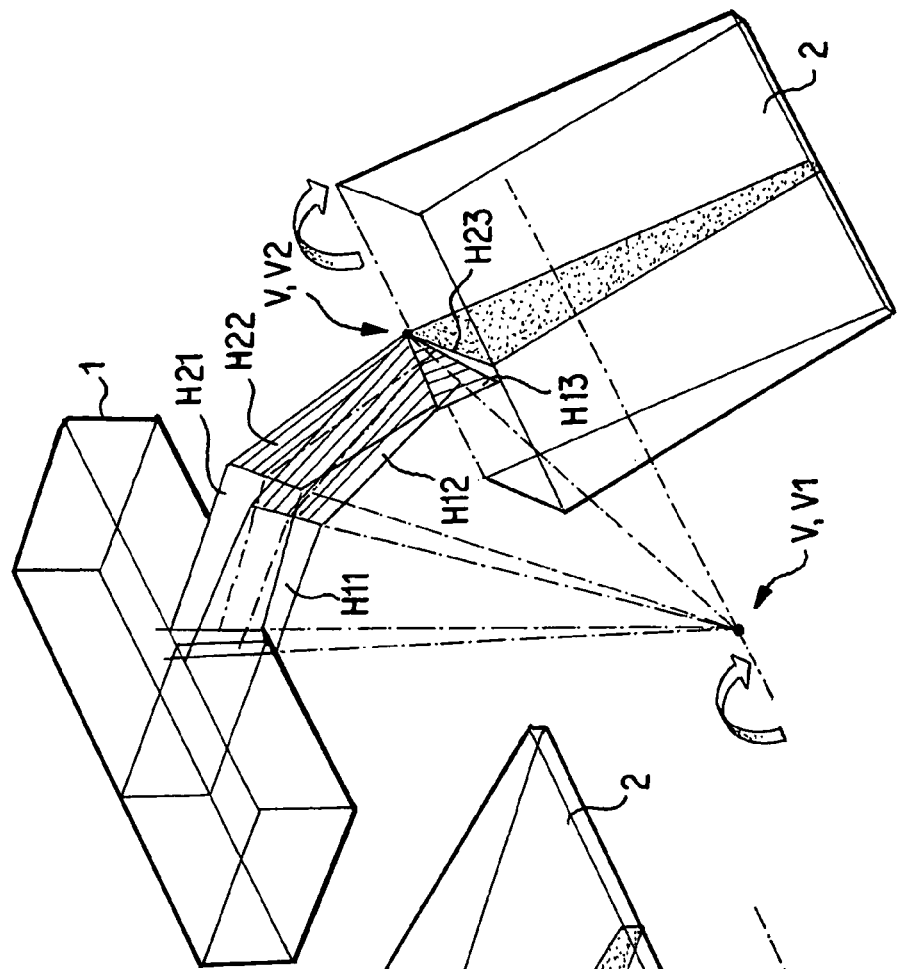
FIG. 24 shows the embodiment according to FIG. 23 in the same view as FIG. 23, but with the control flap in its extended position.
Figure 23:
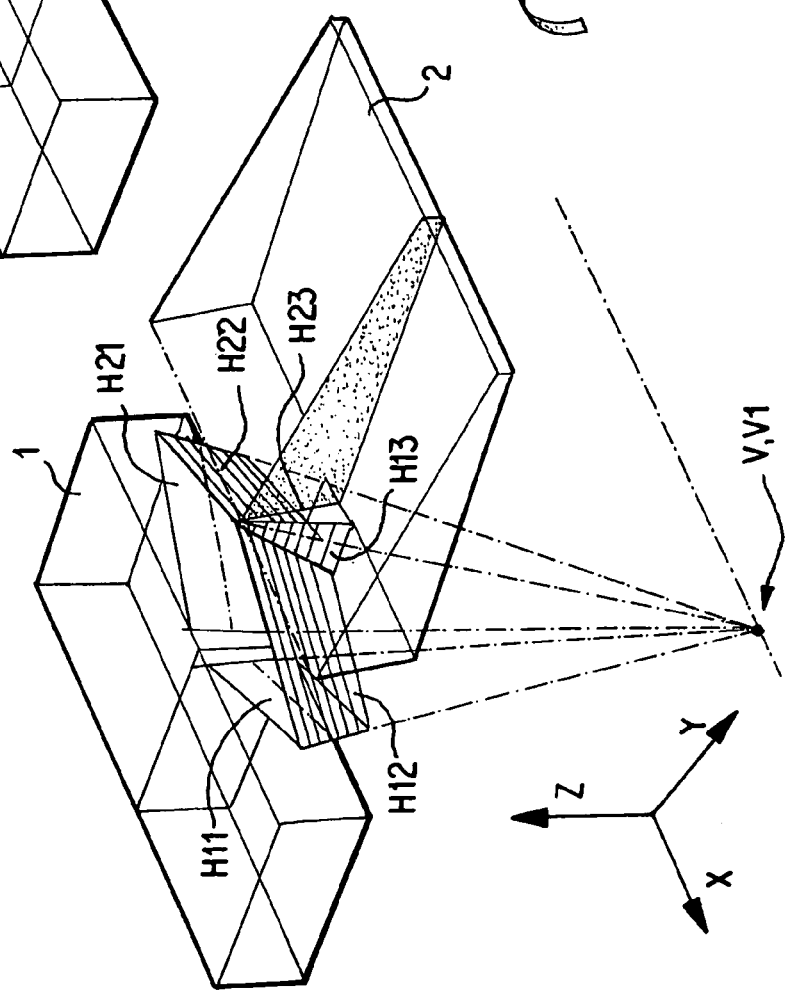
FIG. 23 is a schematic view of another embodiment of the invention as an alternative to the embodiment shown in FIG. 16 and 17, in which the rotary-axis pyramids of the adjustment devices extend in the same orientation and which shows the control flap in its stowed position.
Figure 25:
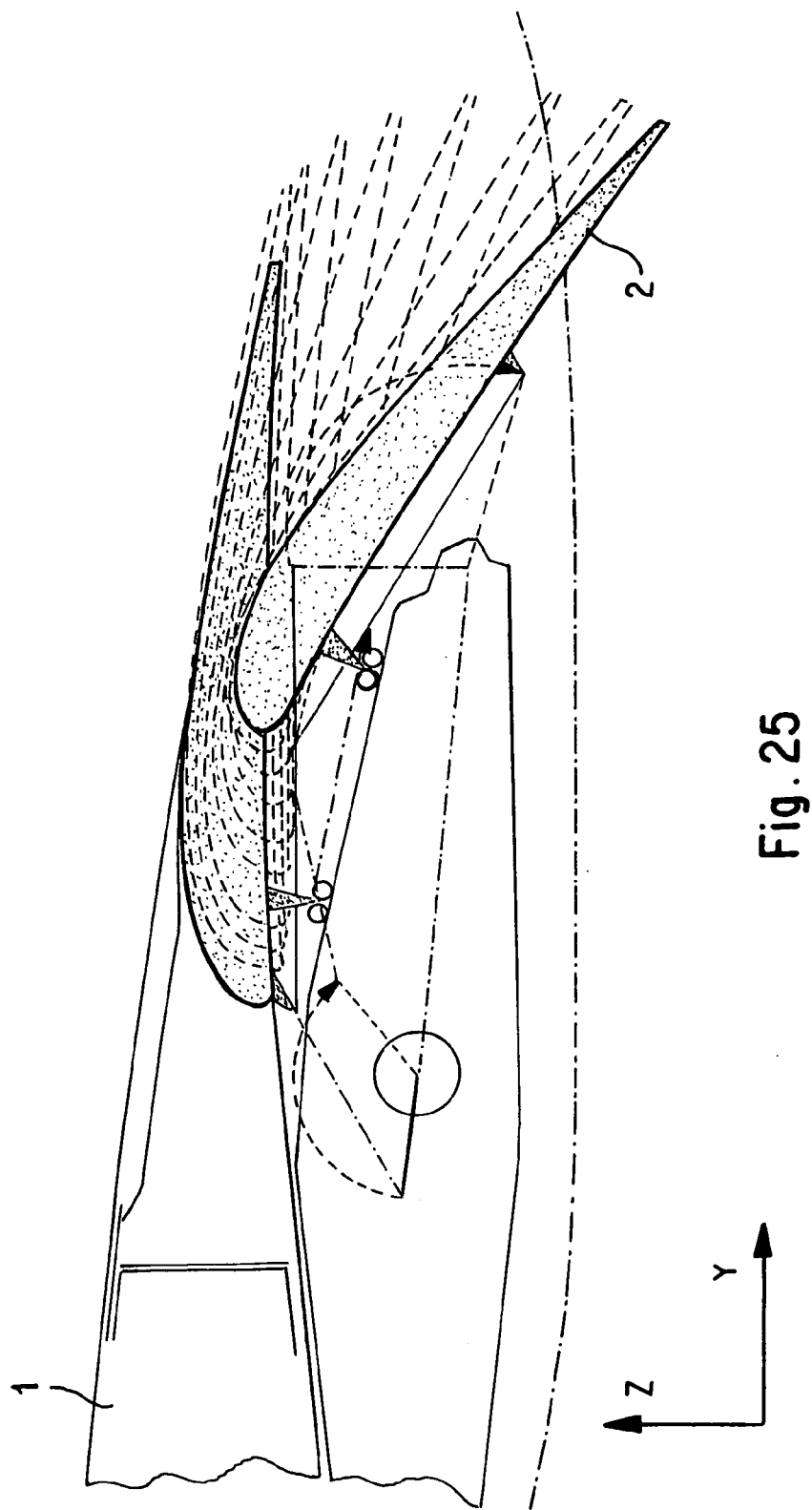
FIG. 25 shows the embodiment according to FIG. 23 in various adjustment positions.

In contrast, in the second embodiment illustrated in FIG. 14 and 15, the first end axis 33 of the first leg 31 of the first pyramid mechanism 30 is connected to the load-bearing structure of the wing 1 at a point which, as seen in the direction of the profile depth, is substantially aligned with or only slightly offset in front of the point at which the second end axis 34 of the second leg 32 is connected indirectly to the control flap 2 via the second pyramid mechanism 40. Thus, the first and second legs 31, 32 of the first pyramid mechanism 30 are moved as the control flap 2 is extended from the acutely angled position depicted in FIG. 14 to the extended position shown in FIG. 15, such that the clear motion is effected about the axis of rotation of the first pyramid mechanism 20.

In the two embodiments shown in FIG. 1, 2; 14, 15, the second pyramid mechanism 20; 40 is mechanically connected in series behind the first pyramid mechanism 10; 30, such that the first leg 21; 41 of the second pyramid mechanism 20; 40 with its first end axis 23; 43 is connected to or shares the second end axis 14; 34 of the first pyramid mechanism 10; 30, and such that the second leg 22; 42 of the second pyramid mechanism 20; 40 with its second end axis 24; 44 is connected to the control flap 2 at a point which, as seen in the direction of the profile depth, lies essentially behind or is only slightly offset from the point where the first leg 21; 41 of the second pyramid mechanism 20; 40 with its end axis 23; 43 is connected to the first pyramid mechanism 10; 30.

Instead of the combination illustrated in FIG. 1, 2; 14, 15 of a first pyramid mechanism 10; 30 with a more remote virtual axis of rotation and a second pyramid mechanism 20; 40 with a more proximal virtual axis of rotation, it is also possible to use a single pyramid mechanism which effects a combined translational and rotational motion similar to the combined motions of the first and second pyramid mechanisms 10, 20; 30, 40.

The invention or its embodiments will now be described with reference to the detail views shown in FIG. 5 to 11 and 18 to 22. FIG. 5 to 11 relate to the schematic view of FIG. 3, 4 and FIG. 18 to 22 to the schematic view of FIG. 16, 17. Features with the same function are identified by the same reference numerals.

Thus, in the embodiments of the invention illustrated in FIG. 3 to 11, 12 and 13, 16 to 22, 23 and 24, at least one lever H31, H32 of the second adjustment unit P2 is coupled, on the one hand, to the adjacent lever H12 and H22 of the first adjustment unit P1 and, on the other hand, to a structural connecting point, i.e., for example, to the control flap 2 or to the one support element of the wing 1. (Note: the element A6 shown in the schematic is merely a connecting element, since it is fixed to the lever H21, H22 at point A7.) To further connect the control flap 2 or the wing 1 to the actuation apparatus B, B1, B2, an additional, optional rotary joint A4 may be provided. In a preferred embodiment of the invention, this rotary joint connects the end axis A13, A23 of the first adjustment unit P1 facing the second adjustment unit P2 to the structural part which can be actuated by the second adjustment unit P2 (the control flap 2 in FIG. 2, 4; 12, 13; 16, 17; 23, 24), such that the axis of the rotary joint A4 extends in the direction of the axis of rotation for the adjustment of the structural part or the control flap 2. The vertex V2 of the joint axis A31, A51 or A32, A52 of the second adjustment unit P2 must be in the center of the axis of the optionally provided additional rotary joint A4 to avoid mechanical jamming of the second adjustment unit P2.

It should again be noted that the actuation apparatuses B1, B2 shown in the figures each have two parallel-acting lever arrangements for each adjustment unit P1, P2. For example, in the actuation apparatuses B1, B2 illustrated in FIGS. 2, 4; 12, 13; 16, 17; 23 and 24, the first adjustment unit P1 has two pairs of levers, i.e., a first pair of adjustment levers H11, H12 and a second pair of adjustment levers H21, H22, and the second adjustment unit P2 has two adjustment levers H31, H22. Both adjustment units could also be configured with only a single set of levers. For example, the first adjustment unit P1 could be realized with only one pair of pivotable adjustment levers (e.g., H11, H12) and the second adjustment unit P2 with one adjustment lever H31 (or H22). Also, one adjustment unit could have one set of levers and another linked adjustment unit could have two sets of levers. It should likewise be noted that more than two adjustment units could be arranged in a chain of action between two mutually adjustable or moving structural parts, each adjustment unit being realized in accordance with one of the described variants. However, the number of pyramid mechanisms used to actuate a control flap depends on the corresponding application.

FIGS. 5 and 6 or 18 and 19, which illustrate the embodiments previously discussed in principle with reference to FIGS. 3 and 4 or 16 and 17, show how the corresponding adjustment units or pyramid mechanisms 50, 60; 70, 80 (P1, P2 in the schematic views of FIGS. 3, 4, 12, 13, 16, 17, 23 and 24) could actually be implemented. To drive the forcibly coupled adjustment units or pyramid mechanisms 50, 60; 70, 80 or P1, P2 and thereby to control the control flap 2 in terms of its extension and retraction, one actuator each is provided. This actuator is depicted, by way example, as a rotary actuator device 100 which is coupled to and driven by a drive shaft 18 or 38 extending substantially in the direction of the length of the wing, i.e., substantially parallel to the virtual axis of rotation of the pyramid mechanisms.

To drive the second adjustment unit P2, that adjustment unit is coupled to the first adjustment unit P1. For this purpose, the first legs 21; 41 of the second adjustment unit 20; 40 can be coupled to or integral with the second legs 12, 32 of the first adjustment unit 10, 30.

As shown in FIG. 5, 6, 10 and 11, the adjustment units 50, 60 and 70, 80 or P1, P2 can each have a symmetrical construction, each with two first legs H11, H12 corresponding to each other and two second symmetrical legs H21, H22 corresponding to each other. This ensures great strength and strong guidance in the direction parallel to the virtual axis of rotation.

FIG. 11 shows how in the second exemplary embodiment the first and second adjustment levers of the first adjustment unit P1 are moved from their angled position with stowed control flap to their extended position with extended control flap.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Actuation apparatus for moving two structural parts relative to each other between a stowed position and an extended position with a rotational and a translational component,
   wherein the actuation apparatus comprises at least one adjustment unit, which is connected at a first end to the load-bearing structure of a wing and at a second end to a control flap, with at least one virtual axis of rotation lying at a finite distance from a plane of the wing, and driving means, with respect to which the structural parts can be displaced in relation to each other,
   further wherein the actuation apparatus comprises a pyramid mechanism arrangement which changes the distance of the control flap from a trailing edge of the wing, and an adjustment device, which is mechanically coupled to the pyramid mechanism arrangement and adjusts the angle of the control flap.

2. Actuation apparatus as claimed in claim 1, wherein the adjustment device is formed by a second pyramid mechanism, which is mechanically connected in series with a first pyramid mechanism of the pyramid mechanism arrangement between the load-bearing structure of the wing and the control flap.

3. Actuation apparatus as claimed in claim 1, wherein the pyramid mechanism arrangement comprises first and second pyramid mechanisms, which are mechanically connected in series between the load-bearing structure of the wing and the control flap.

4. Actuation apparatus as claimed in claim 2, wherein the first and second pyramid mechanisms have virtual axes of rotation, which are located at different distances.

5. Actuation apparatus as claimed in claim 4, wherein the first pyramid mechanism, which is disposed closer to the wing, has a more remote virtual axis of rotation than the virtual axis of rotation of the second pyramid mechanism, which is disposed closer to the control flap.

6. Actuation apparatus as claimed in claim 5, wherein the more remote virtual axis of rotation is at infinity, such that movement of the control flap attributable to the first pyramid mechanism is a translating motion.

7. Actuation apparatus as claimed in claim 5, wherein the first and second pyramid mechanisms each have a first leg and a second leg, each said pair of first and second legs at one end being flexibly interconnected by a common pivot axis and at their respectively opposite ends being connected directly or indirectly to the wing via a first end axis and directly or indirectly to the control flap via a second end axis.

8. Actuation apparatus as claimed in claim 7, wherein the first and the second end axis and the pivot axis intersect at a common vertex, which lies on the virtual axis of rotation.

9. Actuation apparatus as claimed in claim 7, wherein the first leg of the first pyramid mechanism with its first end axis is connected to the load-bearing structure of the wing at a point which, as seen in the direction parallel to the virtual axis of rotation, is laterally offset by a distance that substantially corresponds to the length of the first leg relative to the point at which the second leg with its one end axis is connected directly or indirectly to the control flap.

10. Actuation apparatus as claimed in claim 7, wherein the first leg of the first pyramid mechanism with its first end axis is connected to the load-bearing structure of the wing at a point which, as seen in the direction of the profile depth, lies essentially in front of the point at which the second leg with its second end axis is connected directly or indirectly to the control flap.

11. Actuation apparatus as claimed in any one of claim 7, wherein the second pyramid mechanisms are mechanically connected in series behind the first pyramid mechanisms, wherein the first leg of the second pyramid mechanisms with its first end axis is connected to or shares the second end axis of the first pyramid mechanisms and wherein the second leg of the second pyramid mechanisms with its second end axis is connected to the control flap at a point which, as seen in the direction of the profile depth, lies essentially behind the point at which the first leg with its first end axis is connected to the first pyramid mechanism.

12. Actuation apparatus as claimed in claim 1, wherein the actuation apparatus comprises a single pyramid mechanism arrangement, which serves both to change the distance of the control flap from the trailing edge of the wing and to adjust the angle of the control flap.

13. Actuation apparatus as claimed in claim 1, wherein the driving means for retracting and extending the control flap comprises a rotary actuator device coupled to the first pyramid mechanism.

14. Actuation apparatus as claimed in claim 13, wherein the rotary actuator device is coupled to and driven by a drive shaft extending substantially in the direction of the length of the wing.

15. Actuation apparatus as claimed in claim 1, wherein the second pyramid mechanisms are coupled to and driven by the first pyramid mechanisms.

16. Actuation apparatus as claimed in claim 15, wherein the first legs of the second pyramid mechanisms are coupled to or integral with and driven by the second legs of the first pyramid mechanisms.

17. Actuation apparatus as claimed in claim 1, wherein one of the structural parts is a wing and the other of the structural parts is a control flap of an aircraft.

* * * * *